(12) United States Patent
Svedman et al.

(10) Patent No.: US 12,309,762 B2
(45) Date of Patent: May 20, 2025

(54) APPARATUS, SYSTEM, METHOD, AND COMPUTER-READABLE MEDIUM FOR PERFORMING BEAM FAILURE RECOVERY

(71) Applicant: InterDigital Patent Holdings, Inc., Wilmington, DE (US)

(72) Inventors: Patrick Svedman, Stockholm (SE); Qing Li, Princeton Junction, NJ (US); Mohamed Awadin, Plymouth Meeting, PA (US); Yifan Li, Conshohocken, PA (US); Allan Y. Tsai, Boonton, NJ (US); Guodong Zhang, Woodbury, NY (US); Lakshmi R. Iyer, King of Prussia, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 588 days.

(21) Appl. No.: 17/621,351

(22) PCT Filed: Jun. 25, 2020

(86) PCT No.: PCT/US2020/039579
§ 371 (c)(1),
(2) Date: Dec. 21, 2021

(87) PCT Pub. No.: WO2020/264134
PCT Pub. Date: Dec. 30, 2020

(65) Prior Publication Data
US 2022/0322325 A1    Oct. 6, 2022

Related U.S. Application Data

(60) Provisional application No. 62/868,588, filed on Jun. 28, 2019.

(51) Int. Cl.
*H04W 72/044* (2023.01)
*H04W 24/08* (2009.01)
*H04W 72/02* (2009.01)

(52) U.S. Cl.
CPC ......... *H04W 72/046* (2013.01); *H04W 24/08* (2013.01); *H04W 72/02* (2013.01)

(58) Field of Classification Search
CPC ... H04W 72/046; H04W 24/08; H04W 72/02; H04W 36/00; H04L 5/0094;
(Continued)

(56) References Cited

U.S. PATENT DOCUMENTS

2014/0140270 A1    5/2014  Shaw
2018/0227899 A1    8/2018  Yu et al.
(Continued)

FOREIGN PATENT DOCUMENTS

CN    108702767 A    10/2018
CN    109076620 A    12/2018
(Continued)

OTHER PUBLICATIONS

3GPP TS 38.133, V15.5.0, "Requirements for support of radio resource management", (Release 15), Technical Specification Group Radio Access Network, NR, Mar. 2019, 893 Pages.
(Continued)

*Primary Examiner* — Nizam U Ahmed
(74) *Attorney, Agent, or Firm* — Flaster Greenberg P.C.

(57) ABSTRACT

An electronic device including a transceiver to communicate with a network; and circuitry. The circuitry is configured to perform beam failure detection on a monitored cell; detect a beam failure on the monitored cell; determine at least one new set of candidate beam reference signals (CB-RSs) from at least one set of CB-RS configured for the device; determine if any CB-RS in the at least one new set of CB-RSs
(Continued)

meets a criterion, and in a case that any CB-RS in the at least one new set of CB-RSs meets the criterion: select a beam corresponding to a CB-RS in the new set that meets the criterion as the new beam, and indicate the selected new beam to the network; and in a case that no CB-RS in the new set of CB-RS meets a criterion, indicate to the network that no CB-RS in the new set meets the criterion.

20 Claims, 10 Drawing Sheets

(58) Field of Classification Search
CPC ... H04L 5/0023; H04L 5/0048; H04L 5/0051; H04B 7/0695
See application file for complete search history.

(56) References Cited

U.S. PATENT DOCUMENTS

| | | | |
|---|---|---|---|
| 2018/0302889 | A1 | 10/2018 | Guo et al. |
| 2019/0053314 | A1* | 2/2019 | Zhou ............... H04W 76/18 |
| 2019/0082335 | A1 | 3/2019 | Yu et al. |
| 2019/0166539 | A1 | 5/2019 | Chen et al. |
| 2020/0137821 | A1* | 4/2020 | Cirik ............... H04W 72/1268 |
| 2021/0105765 | A1* | 4/2021 | Cirik ............... H04W 76/18 |
| 2021/0168879 | A1 | 6/2021 | Jiang |
| 2021/0314049 | A1* | 10/2021 | Matsumura ........... H04W 24/10 |

FOREIGN PATENT DOCUMENTS

| | | |
|---|---|---|
| CN | 109842894 A | 6/2019 |
| EP | 3461026 A1 | 3/2019 |
| EP | 3648368 A1 | 5/2020 |
| WO | 2019/032882 A1 | 2/2019 |
| WO | 2019/084570 A1 | 5/2019 |
| WO | WO 2019/095151 A1 | 5/2019 |
| WO | 2020/092752 A1 | 5/2020 |

OTHER PUBLICATIONS

3GPP TS 38.213, V15.5.0, Technical Specification Group Radio Access Network, NR, Physical layer procedures for control (Release 15), Mar. 2019, 104 Pages.

3GPP TS 38.214, V15.5.0, 3rd Generation Partnership Project, Technical Specification Group Radio Access Network, NR, Physical layer procedures for data (Release 15), Mar. 2019, 103 Pages.

3GPP TS 38.306, V15.5.0, 3rd Generation Partnership Project, Technical Specification Group Radio Access Network, NR, User Equipment (UE) radio access capabilities, (Release 15), Mar. 2019, 49 Pages.

3GPP TS 38.321, V15.5.0, 3rd Generation Partnership Project, Technical Specification Group Radio Access Network, NR, Medium Access Control (MAC) protocol specification (Release 15), Mar. 2019, 78 Pages.

3GPP TS 38.331, V15.5.0, 3rd Generation Partnership Project, Technical Specification Group Radio Access Network, NR, Radio Resource Control (RRC) protocol specification (Release 15), Mar. 2019, 491 Pages.

3rd Generation Partnership Project; "Review issue list for TS 38.331 EN-DC ASN.1 freeze", Ericsson, R2-1801604, 3GPP TSG-RAN2#AH-1801, Vancouver, Canada, Jan. 22-26, 2018, 366 pages.

* cited by examiner

APPARATUS, SYSTEM, METHOD, AND COMPUTER-READABLE MEDIUM FOR PERFORMING BEAM FAILURE RECOVERY

CROSS-REFERENCE TO RELATED APPLICATIONS

This application is the National Stage Application of International Patent Application No. PCT/US2020/039579, filed Jun. 25, 2020 which claims the benefit of U.S. Provisional Application No. 62/868,588, filed on Jun. 28, 2019, the entire contents of which are incorporated by reference herein.

FIELD

The present disclosure relates generally to wireless communications, and more particularly to wireless communications systems, devices, methods, and computer-readable medium for performing beam failure recovery in a 5G network.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Existing beam failure recovery methods have a high configuration/reconfiguration overhead of candidate beam reference signals (CB-RS) and there is a high transmission overhead of CB-RS. For example, when using CB-RS in a cell monitored for beam failure (monitored cell), configuration of CB-RS on each bandwidth part (BWP) of the cell configured for a UE can mean significant RRC reconfiguration overhead when CB-RS needs to be reconfigured due to mobility. Furthermore, when different UEs in the cell use different BWPs, the CB-RS transmission overhead may be significant since the network may have to transmit CB-RS in each active DL BWP of the cell. Additionally, considering that a UE may simultaneously have many activated serving cells, the overall CB-RS configuration/reconfiguration overhead, as well as the transmission overhead, in the network may be overwhelming.

SUMMARY

An exemplary embodiment of the present disclosure provides an electronic device including a transceiver configured to communicate with a network; and circuitry. The circuitry is configured to perform beam failure detection on a monitored cell; detect a beam failure on the monitored cell; determine at least one new set of candidate beam reference signals (CB-RSs) from at least one set of CB-RS configured for the electronic device; determine if any CB-RS in the at least one new set of CB-RSs meets a criterion, and in a case it is determined that any CB-RS in the at least one new set of CB-RSs meets the criterion: select a beam corresponding to a CB-RS in the new set that meets the criterion as the new beam, and indicate the selected new beam to the network; and in a case it was determined that no CB-RS in the new set of CB-RS meets a criterion, indicate to the network that no CB-RS in the at least one new set of CB-RSs meets the criterion.

An exemplary embodiment of the present disclosure provides a method performed by an electronic device. The method includes performing beam failure detection on a monitored cell; detecting a beam failure on the monitored cell; determining at least one new set of candidate beam reference signals (CB-RSs) from at least one set of CB-RS configured for the electronic device; determining if any CB-RS in the at least one new set of CB-RSs meets a criterion, and in a case it is determined that any CB-RS in the at least one new set of CB-RSs meets the criterion: selecting a beam corresponding to a CB-RS in the at least one new set that meets the criterion as the new beam, and indicating the selected new beam to the network; and in a case it was determined that no CB-RS in the at least one new set of CB-RS meets a criterion, indicate to the network that no CB-RS in the at least one new set of CB-RSs meets the criterion.

An exemplary embodiment of the present disclosure provides a non-transitory computer-readable medium including computer-executable instructions, which when executed by an electronic device, cause the electronic device to: A non-transitory computer-readable medium including computer-executable instructions, which when executed by an electronic device, cause the electronic device to: perform beam failure detection on a monitored cell; detect a beam failure on the monitored cell; determine at least one new set of candidate beam reference signals (CB-RSs) from at least one set of CB-RS configured for the electronic device; determine if any CB-RS in the at least one new set of CB-RSs meets a criterion, and in a case it is determined that any CB-RS in the at least one new set of CB-RSs meets the criterion: select a beam corresponding to a CB-RS in the at least one new set that meets the criterion as the new beam, and indicate the selected new beam to the network; and in a case it was determined that no CB-RS in the at least one new set of CB-RS meets a criterion, indicate to the network that no CB-RS in the at least one new set of CB-RSs meets the criterion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
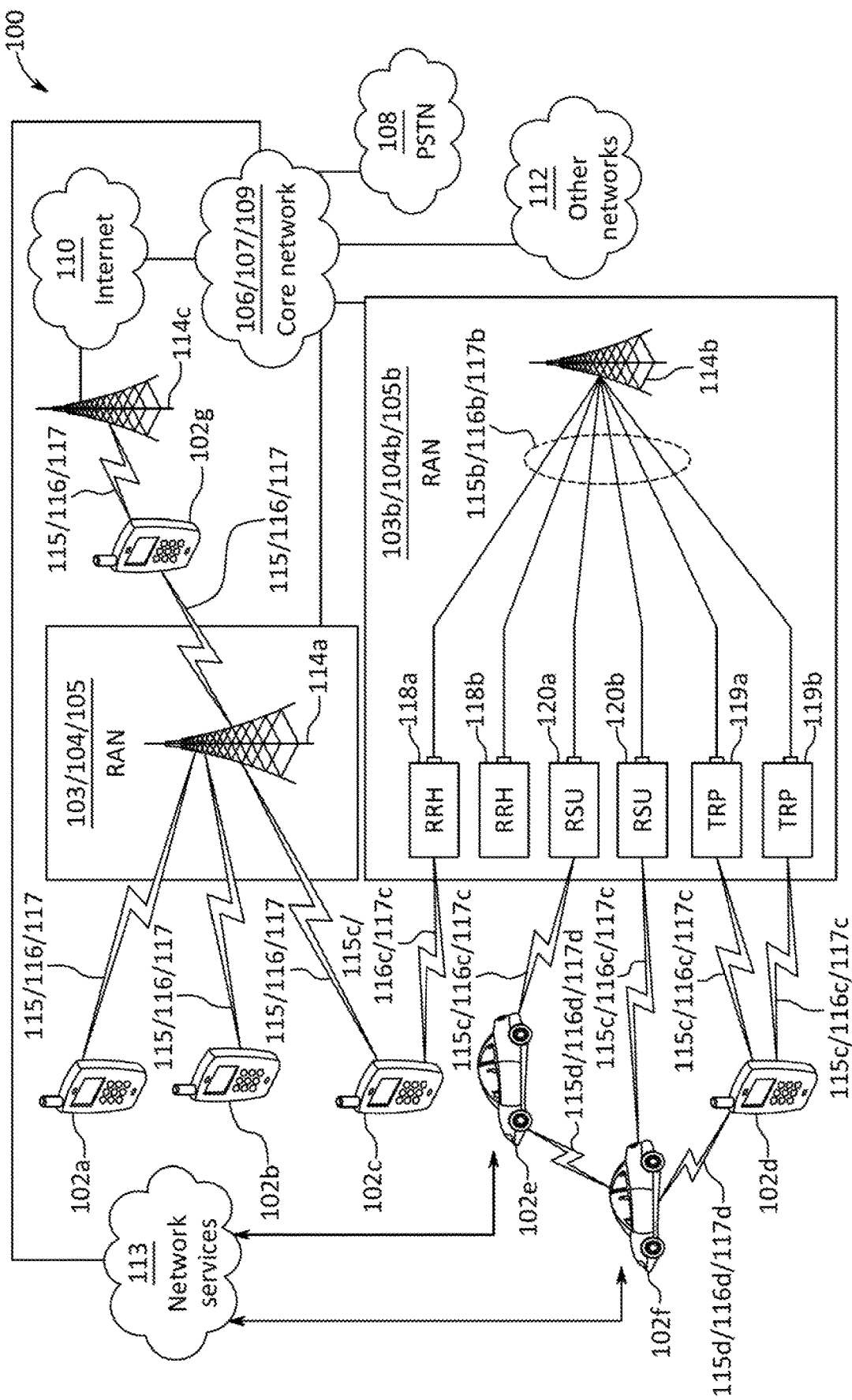
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

This disclosure describes various UE procedures for new beam identification (NBI) based on candidate beams, represented by candidate beam RS (CB-RS), including the UE reporting that no new beam could be identified.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

| | ABBREVIATIONS |
|---|---|
| BF | Beam Failure |
| BFD | Beam Failure Detection |
| BFR | Beam Failure Recovery |
| BFRQ | Beam Failure Recovery ReQuest |
| BFRR | Beam Failure Recovery Response |
| BLER | Block Error Rate |
| BSR | Buffer Status Report |
| BWP | BandWidth Part |
| CBRA | Contention-based Random Access |
| CB-RS | Candidate Beam RS |
| CC | Component Carrier |
| CFRA | Contention-free Random Access |
| CORESET | Control Resource Set |
| CRC | Cyclic Redundancy Check |
| C-RNTI | Cell Radio-Network Temporary Identifier |
| CS-RNTI | Configured Scheduling Radio-Network Temporary Identifier |
| CSI-RS | Channel State Information RS |
| DCI | Downlink Control Information |
| DL | Downlink |
| eMBB | enhanced Mobile Broadband |
| FDD | Frequency Division Duplex |
| FR1 | Frequency Range 1 (low frequencies, e.g. below 7.125 GHz or 6 GHz) |
| FR2 | Frequency Range 2 (high frequencies, e.g. above 7.125 GHz or 6 GHz) |
| gNB | NR NodeB |
| IE | Information Element |
| L1-RSRP | Layer-1 RSRP |
| LTE | Long Term Evolution |
| MAC | Medium Access Control |
| MAC CE | MAC Control Element |
| MCG | Master Cell Group |
| MIB | Master Information Block |
| NB | New Beam |
| NBI | New Beam Identification |
| NR | New Radio |
| NW | Network |
| NZP | Non-zero Power |
| OFDM | Orthogonal Frequency Division Multiplexing |
| PBCH | Physical Broadcast Channel |
| PCell | Primary Cell |
| PDCCH | Physical Downlink Control CHannel |
| PDSCH | Physical Downlink Shared CHannel |
| PUCCH | Physical Uplink Control Channel |
| PUSCH | Physical Uplink Shared Channel |
| PHY | Physical Layer |
| PRACH | Physical Random Access Channel |
| PSCell | Primary SCG Cell |
| QCL | Quasi Co-location |
| RA | Random Access |
| RACH | Random Access Channel |
| RAN | Radio Access Network |
| RLF | Radio Link Failure |
| RLM | Radio Link Monitoring |
| RNTI | Radio Network Temporary Identification |
| RRC | Radio Resource Control |
| RS | Reference Signal(s) |
| RSRP | Reference Signal Received Power |
| SCell | Secondary Cell |
| SCG | Secondary Cell Group |
| SpCell | Special Cell (PCell or PSCell) |
| SR | Scheduling Request |

-continued

| ABBREVIATIONS | |
|---|---|
| SRS | Sounding Reference Signal |
| SS | Synchronization Signal |
| SSB | SS/PBCH Block |
| TAG | Timing Advance Group or Time-Alignment Group |
| TCI | Transmission Configuration Indicator |
| TDD | Time Division Duplex |
| TRS | Tracking Reference Signal |
| TTI | Transmission Time Interval |
| UCI | Uplink Control Information |
| UE | User Equipment |
| UL | Uplink |
| URLLC | Ultra reliable and low latency communications |

Example Communication System and Networks

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
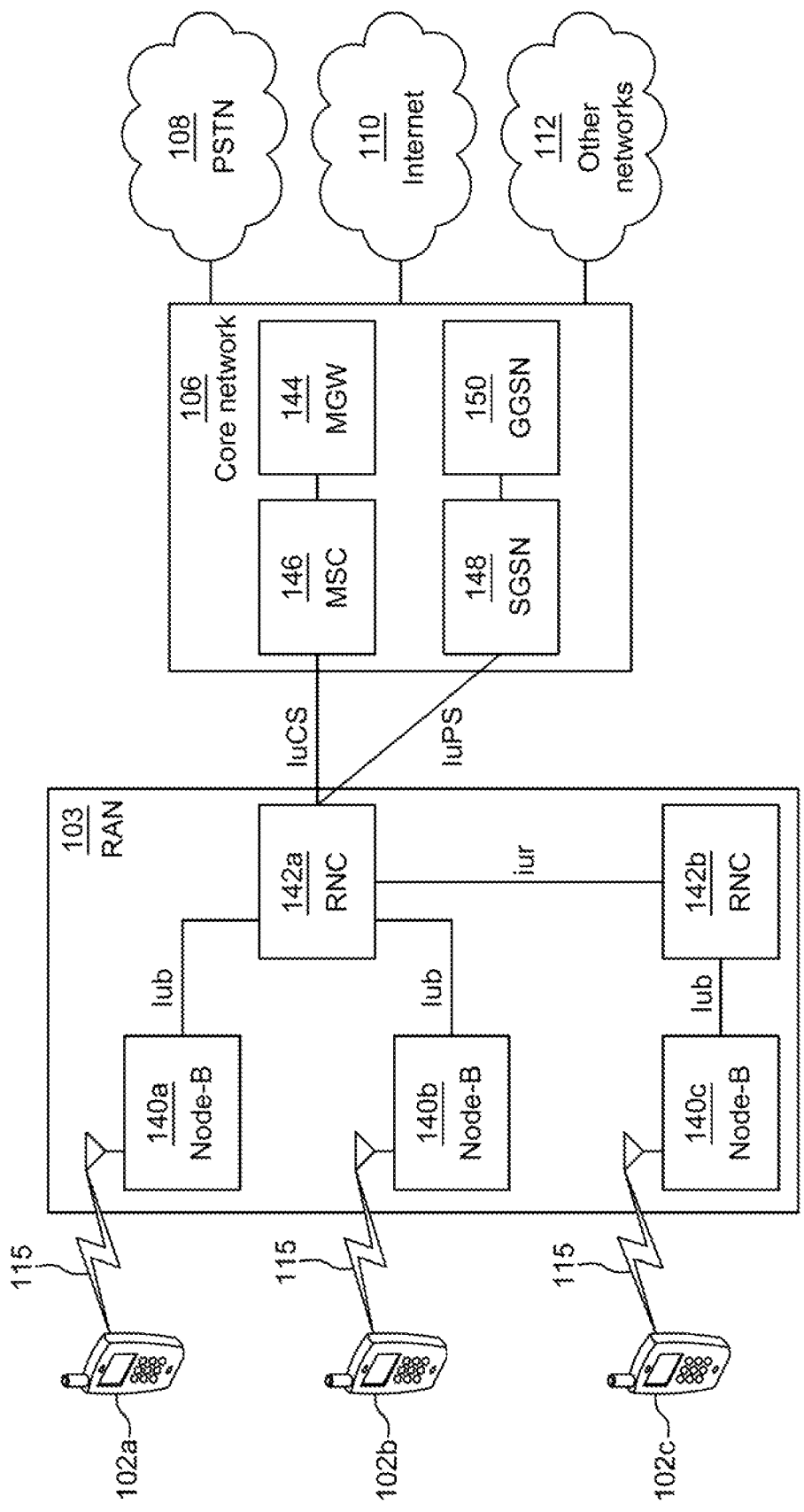
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
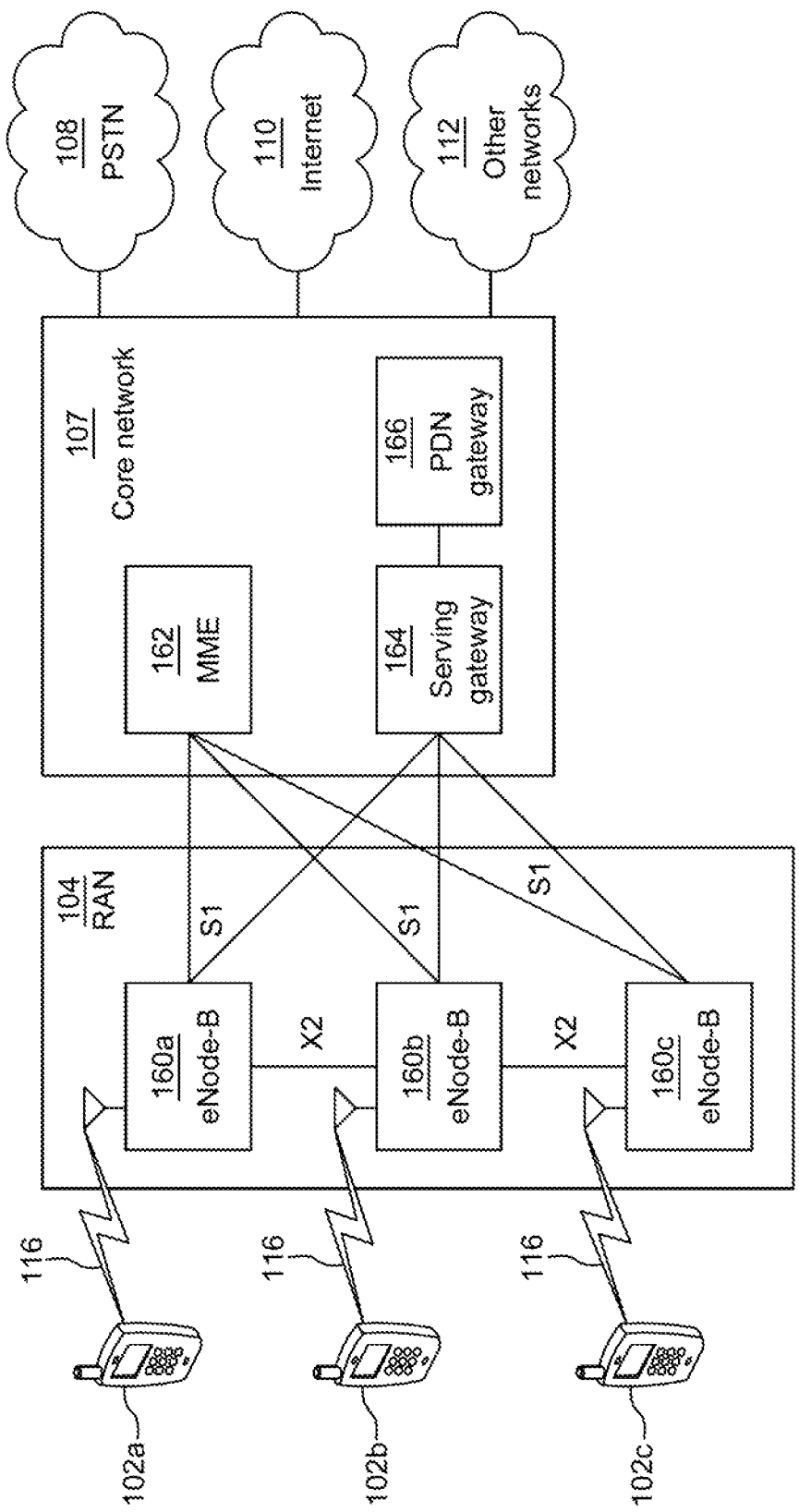
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
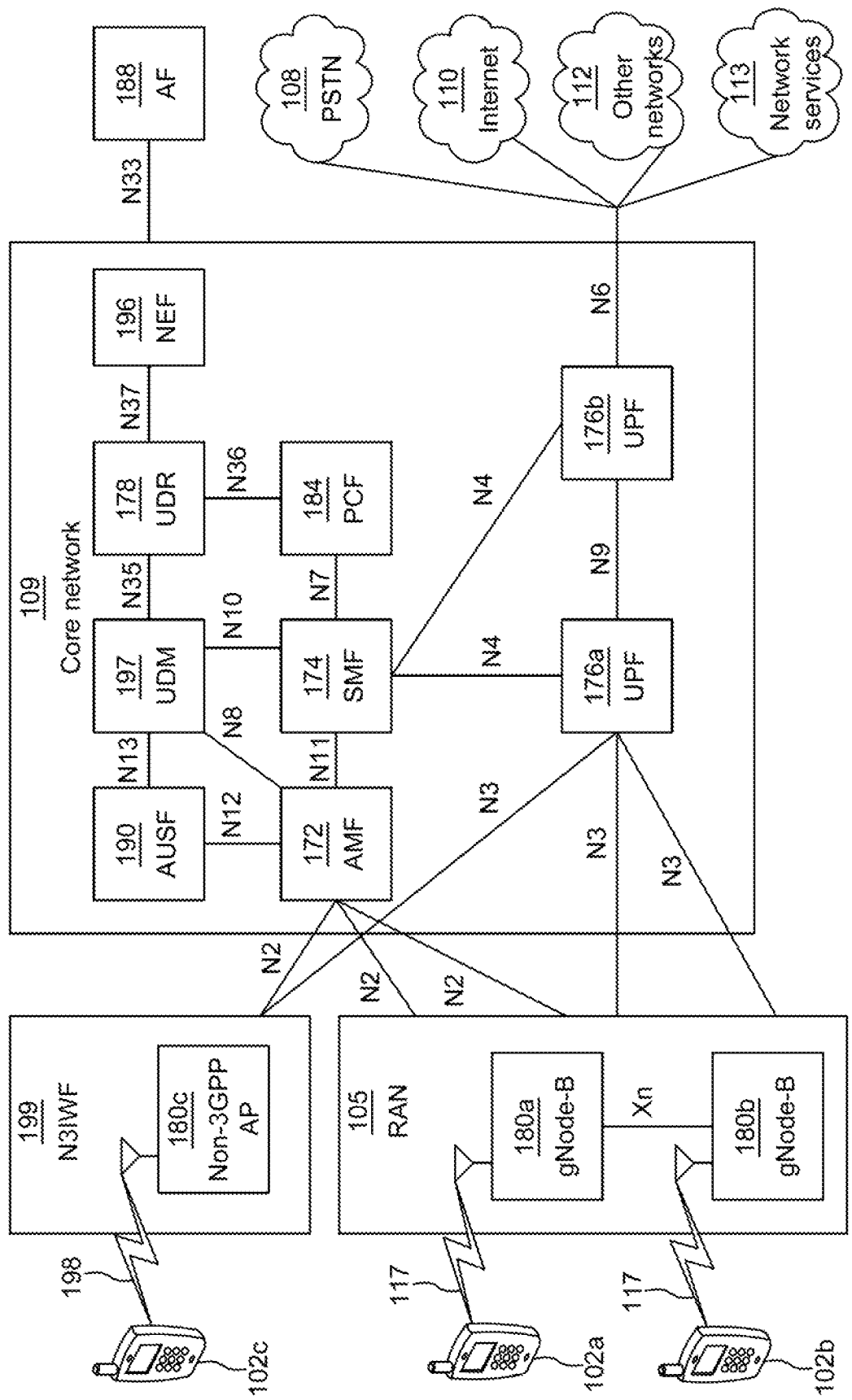
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilitates communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
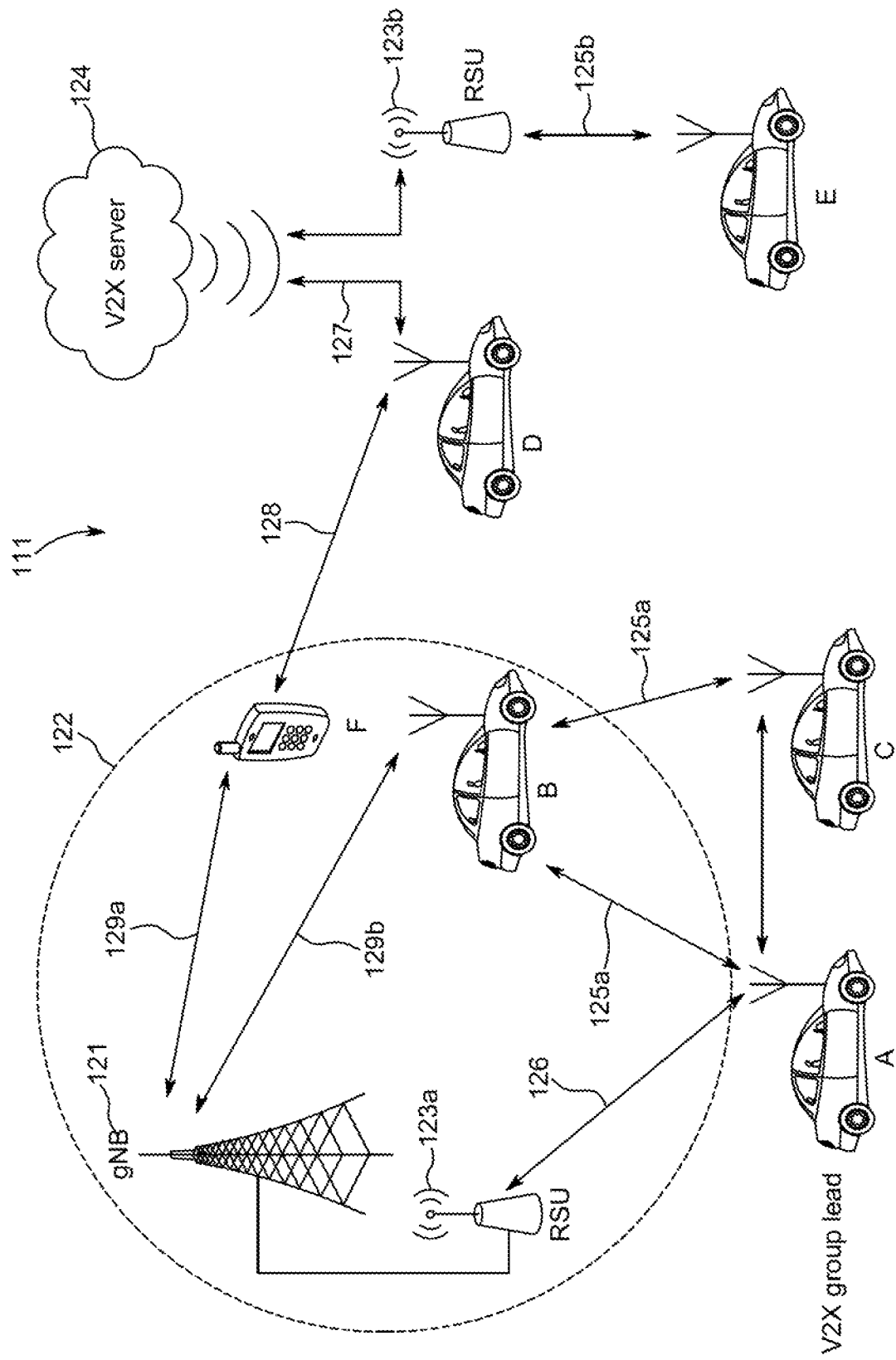
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 a,125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
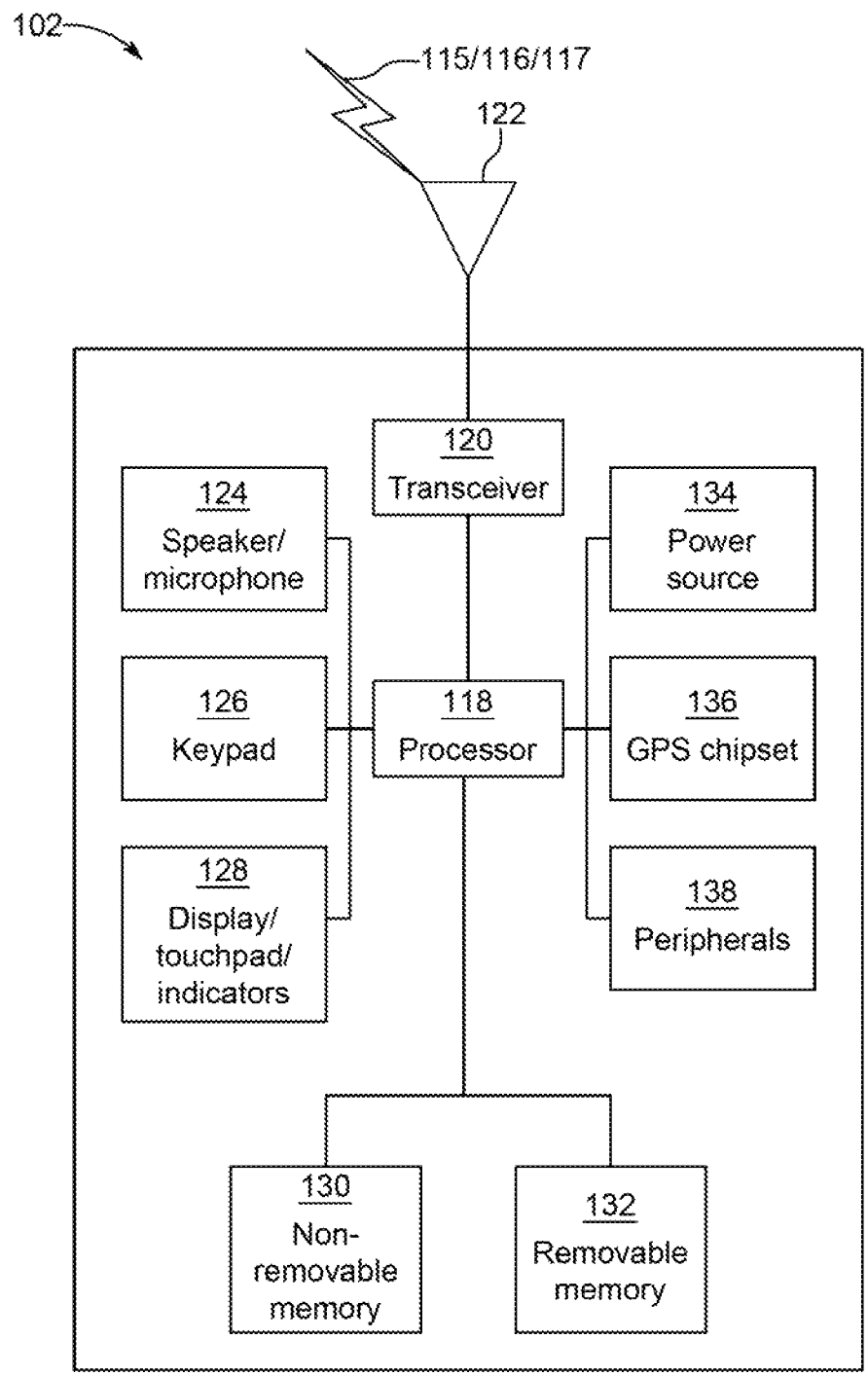
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
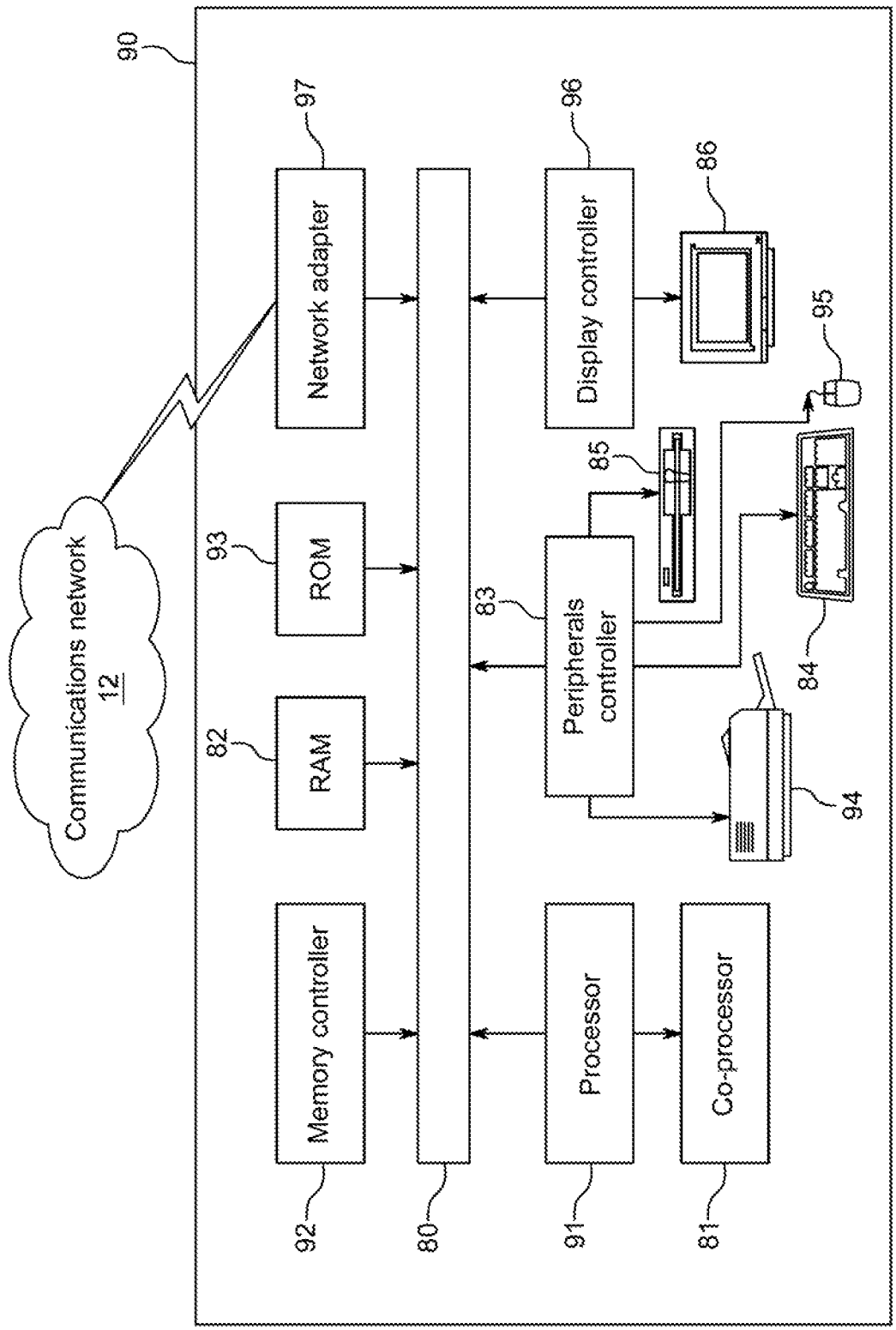
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Link Recovery

Link recovery, i.e. beam failure detection (BFD), new beam identification (NBI) and/or beam failure recovery (BFR), are UE (e.g. 102a, 102b, 102c, etc.) procedures aiming to maintain a communication link between the network and a UE. By these procedures, a UE can detect beam failure (BFD), identify a new candidate beam (NBI) and recover from the beam failure by indicating the new beam to the network (BFR).

In some cases, "BFR" is used to denote the whole procedure including BFD, NBI and BFR. In some cases, "link recovery" is used to denote the whole procedure or parts of it, e.g. BFD, NBI and/or BFR.

SCell Activation/Deactivation

A UE can be RRC configured with a set of secondary cells (SCells).

An SCell is activated for a UE through MAC CE indication.

An SCell can be deactivated for a UE in a number of ways, e.g.:
  deactivation through MAC CE indication
  expiry of an sCellDeactivationTimer timer
  at handover BWP Operation A UE can be configured with a set of DL BWPs and a set of UL BWPs for a serving cell. A BWP can be either active or inactive. All BWPs are inactive in a deactivated SCell.

A BWP can be activated and/or deactivated for a UE in a number of ways, e.g.:
  The UE receives a bandwidth part indicator in a DCI, which indicates a BWP switch to the UE, i.e. to activate a BWP and deactivate another BWP.
  In some cases, upon initialization of a random access procedure, e.g. following beam failure.
  If a UE is configured with a BWP inactivity timer for a serving cell, the UE switches to a default BWP at expiry of the timer.
    The timer is reset if the UE receives a PDCCH (addressed to the UEs C-RNTI or CS-RNTI) indicating DL assignment or UL grant on the active DL BWP or for the active DL BWP.

Issues Addressed by the Embodiments

Consider BFR for a cell, e.g. a serving SCell, with the following properties:

Candidate beam RS (CB-RS) in the same or on another component carrier (CC), i.e. another serving cell, can be RRC configured.

Selection of new beam is based on L1-RSRP of CB-RS. Only a CB-RS with L1-RSRP above a threshold can be selected.

BFRQ shall convey
new beam information, if at least one CB-RS has L1-RSRP above threshold,
or
no new beam information, if no CB-RS has L1-RSRP above threshold.

Beam failure on one cell (e.g. an SCell) cannot trigger BWP switch on another cell (e.g. an SpCell) or cell activation for the purpose of new beam identification.

In order to determine if at least one CB-RS has L1-RSRP above the threshold, the UE needs to perform measurement(s) on the CB-RS. However, if a CB-RS is on another serving cell, i.e. not the cell on which beam failure detection is performed, the UE might not be able to perform the L1-RSRP measurement, for example, since the cell is deactivated, or if the CB-RS is not transmitted in the active DL BWP of the other serving cell. A UE procedure to handle this situation is required.

Considering the case with CB-RS in the monitored cell, configuration and transmission of CB-RS on each BWP of the cell can mean significant CB-RS transmission overhead as well as the RRC reconfiguration overhead when CB-RS need to be reconfigured due to mobility. Supporting BFR on each BWP of the monitored cell without configuration and transmission of CB-RS on each BWP would be beneficial.

Overview

This disclosure describes various exemplary UE procedures for new beam identification (NBI) based on candidate beams, represented by candidate beam RS (CB-RS), including the UE reporting that no new beam could be identified.

One part of the procedure deals with potential UE-initiated BWP switching on the failed cell. The UE would switch to another BWP upon beam failure in order to perform NBI on CB-RS transmitted in the other BWP. Supporting such a procedure would allow a reduction in RS transmission and configuration overhead.

Another part of the procedure deals with the potential NBI based on RS transmitted on other cells than the failed cell. It is not feasible to allow UE-initiated BWP switching on one cell due to beam failure on another cell. Hence, NBI needs to take into account the cell and BWP states on the other cells on which CB-RS are transmitted. In particular, the UE report that no new beam could be identified should be based only on the CB-RS transmitted in active BWPs.

Overview of Link Recovery

Link recovery includes one or more of the following steps:
beam failure detection (BFD),
new beam identification (NBI) based on measurement(s) on candidate beam RS (CB-RS)
beam failure recovery request (BFRQ), and/or
beam failure recovery response (BFRR).

Link recovery is sometimes called beam failure recovery (BFR).

In this disclosure, reference signal and reference signals are abbreviated as RS. Hence, "RS", "BFD-RS" or "CB-RS" may refer to one or multiple reference signal(s). Words in italic, e.g. ServingCellConfig, indicate parameter names, e.g. in an information element (IE) in an RRC specification. The terms "index", "ID" and "identity" are used interchangeably herein.

Beam Failure Detection (BFD)

A UE can perform beam failure detection on a cell, e.g. a serving cell, henceforth sometimes called "monitored cell". The monitored cell may be an SpCell or an SCell. If the UE detects beam failure on the monitored cell, it is henceforth sometimes called "failed cell". Beam failure may be detected on the MAC layer following a number of beam failure indications from the physical layer.

The BFD can be based on UE measurements on one or more BFD-RS, which in some examples are transmitted in the monitored cell, and in some examples are transmitted in another cell, e.g. in the same band as the monitored cell. In some cases, "another cell" may be referred to as another component carrier (CC), which indicates that the other cell is on a different frequency location (carrier) than the monitored cell. Below, "cell" and "component carrier (CC)" are sometimes used interchangeably, and sometimes written cell/CC, which can mean either cell or CC or both. In, for example, frequency division duplexing, the downlink of a cell can be on one CC whereas the uplink is on another CC.

BFD-RS can, for example, be configured for a BWP, e.g. a DL BWP. This means that different BWPs may be configured with different BFD-RS. Hence, the currently used BFD-RS may be the BFD-RS configured for the active BWP, e.g. active DL BWP.

In some examples, the BFD-RS are configured per cell for a UE, e.g. a serving cell, i.e. not per BWP. In some examples, the UE applies the numerology of the active DL BWP to the per-cell configured BFD-RS. A numerology may include aspects such as subcarrier spacing, cyclic prefix, etc. In some examples, the UE assumes that the part of the BFD-RS that falls within the bandwidth of the active DL BWP is transmitted.

In some examples, the BFD-RS are explicitly RRC configured. In some examples, the BFD-RS are implicitly configured, e.g. by not explicitly RRC configuring BFD-RS, whereby the UE performs BFD on RS that are indicated to be quasi collocated with CORESET(s) used for PDCCH monitoring by the UE.

New Beam Identification (NBI)

New beam identification may be based on measurements on candidate beam RS (CB-RS), which may be CSI-RS, e.g. CSI-RS for beam management (e.g. non-zero power CSI-RS), and/or SS/PBCH block(s) (SSBs). The measurement may be, for example, RSRP, e.g. L1-RSRP.

The CB-RS may be configured to a UE by the network, e.g. using RRC signaling or using a combination of RRC and MAC signaling. For example, one set of CB-RS are configured with RRC signaling and MAC CE signaling, in which RRC signaling configures a larger set of CB-RS and MAC CE signaling configures a subset from the larger set.

In various examples, a set of CB-RS are configured per BWP, e.g. DL BWP and/or UL BWP. This means that different BWPs in a monitored cell, e.g. different DL BWPs and/or different UL BWPs, may be configured with different sets of CB-RS. In some examples, different BWPs in a monitored cell may be configured with CB-RS in different sets of cells, e.g. a first BWP in the monitored cell is configured with CB-RS in the monitored cell, a second BWP in the monitored cell is configured with CB-RS in one or more other cells, a third BWP in the monitored cell is configured with CB-RS in the monitored cell and in one or more other cells, etc. This could result in that the set of CB-RS for a monitored cell changes as the active BWP changes, e.g. the active DL BWP and/or active UL BWP changes. For example, a BWP in the monitored cell A can be configured with a set of CB-RS comprising the SSBs transmitted in a different cell B, e.g. adjacent in frequency.

In an exemplary embodiment, a set of CB-RS can be configured for a UE by using RS indices, e.g. one or more CSI-RS resource indices (non-zero power CSI-RS resource Id) and/or one or more SSB indices. In an exemplary embodiment, CB-RS for a BWP can be configured for a UE by optionally configuring a cell/CC, e.g. serving cell index. In an exemplary embodiment, the cell/CC index is common for all CB-RS for a BWP, i.e. the RS indices refer to RS on the configured cell/CC. In an exemplary embodiment, a cell/CC index, e.g. serving cell index, can be optionally configured for a UE per CB-RS and/or per set of CB-RS, e.g. a NZP CSI-RS resource set and/or an SSB resource set and/or a CSI resource set containing both NZP CSI-RS and/or SSB(s). This can be used to configure different CB-RS (for the same BWP) that are on different cells/CCs. If an optional configuration of a cell/CC is absent, e.g. for a CB-RS, the CB-RS indices can, for example, refer to RS on the current cell in which the CB-RS configuration is included, e.g. the monitored cell.

The network can, for example, transmit CB-RS on the monitored cell. In an exemplary embodiment, CB-RS can be transmitted on another cell (or "another CC"). In an exemplary embodiment, CB-RS can be transmitted on multiple cells. In an exemplary embodiment, the CB-RS are transmitted on the monitored cell and on one or more other cell(s). In an exemplary embodiment, the CB-RS are transmitted on multiple other cells, but not on the monitored cell. In an exemplary embodiment, the other cell(s) are in the same frequency band as the monitored cell.

An RS being transmitted in a cell can, for instance, mean that the RS is configured for a UE in the serving cell configuration (e.g. ServingCellConfig), e.g. a CSI measurement configuration (e.g. CSI-MeasConfig) in the case of CSI-RS. In some cases, an RS being transmitted in a cell can mean, e.g. in the case of SSB, that the SSB carries a corresponding cell identity, e.g. physical cell identity (PCI), and/or that the RS can be, at least partly, configured in the system information of the cell received by the UE, e.g. an indication of actually transmitted SSBs (e.g. ssb-PositionsInBurst in SIB1).

An RS being transmitted in a BWP (of a cell) can for instance mean that the RS bandwidth configured for a UE is, at least partly, within the bandwidth of the BWP, as configured for the UE. In an exemplary embodiment, it also means that the RS numerology configured for a UE, e.g. subcarrier spacing, is the same as the numerology used for the BWP. In an exemplary embodiment, an RS configured for a UE with different numerology than the BWP can be considered to be transmitted in a BWP if the RS at least partly falls within a measurement gap configured for the BWP and UE. In an exemplary embodiment, an RS configured for a UE to be transmitted partially or completely outside the BWP bandwidth can be transmitted in a BWP if the RS at least partly falls within a measurement gap configured for the BWP and UE. A measurement gap can, for example, be a periodic time window in which the UE does not have to receive control and data channels.

In an exemplary embodiment, an RS, e.g. a CSI-RS also configured as CB-RS, is configured for a serving cell, e.g. in a CSI measurement configuration such that the configured RS bandwidth spans, at least partly, multiple DL BWPs. In an exemplary embodiment, an RS spans, at least partly, all DL BWPs configured for the cell, for example, by spanning at least the whole bandwidth of the cell. In an exemplary embodiment, a UE is, for a cell, configured with multiple DL BWPs with corresponding CSI resource configurations (e.g. CSI-ResourceConfig) that each include an RS that spans, at least partly, the DL BWPs, e.g. by including RS resources sets (e.g. by NZP-CSI-RS-ResourceSetId) that contain the RS.

In an exemplary embodiment, a UE is configured with a DL BWP with a configuration for PDCCH (e.g. PDCCH-ConfigCommon and/or PDCCH-Config) and/or a configuration for PDSCH (e.g. PDSCH-ConfigCommon and/or PDSCH-Config), but with a configuration for CSI measurement (e.g. a CSI-MeasConfig incl. the corresponding BWP index). The DL BWP can, for example, be such that it spans, at least approximately, the bandwidth of an RS, e.g. a CSI-RS also configured as CB-RS. Such a configuration could be useful, for example, when the RS is a CB-RS for another cell, i.e. to be used for NBI when another cell has failed. The DL BWP (with no PDCCH/PDSCH configured) could be used to almost deactivate the cell (e.g. for UE power saving), but still keep the RS resource configuration active, in order to maintain the NBI functionality for the other cell.

Figure 2:
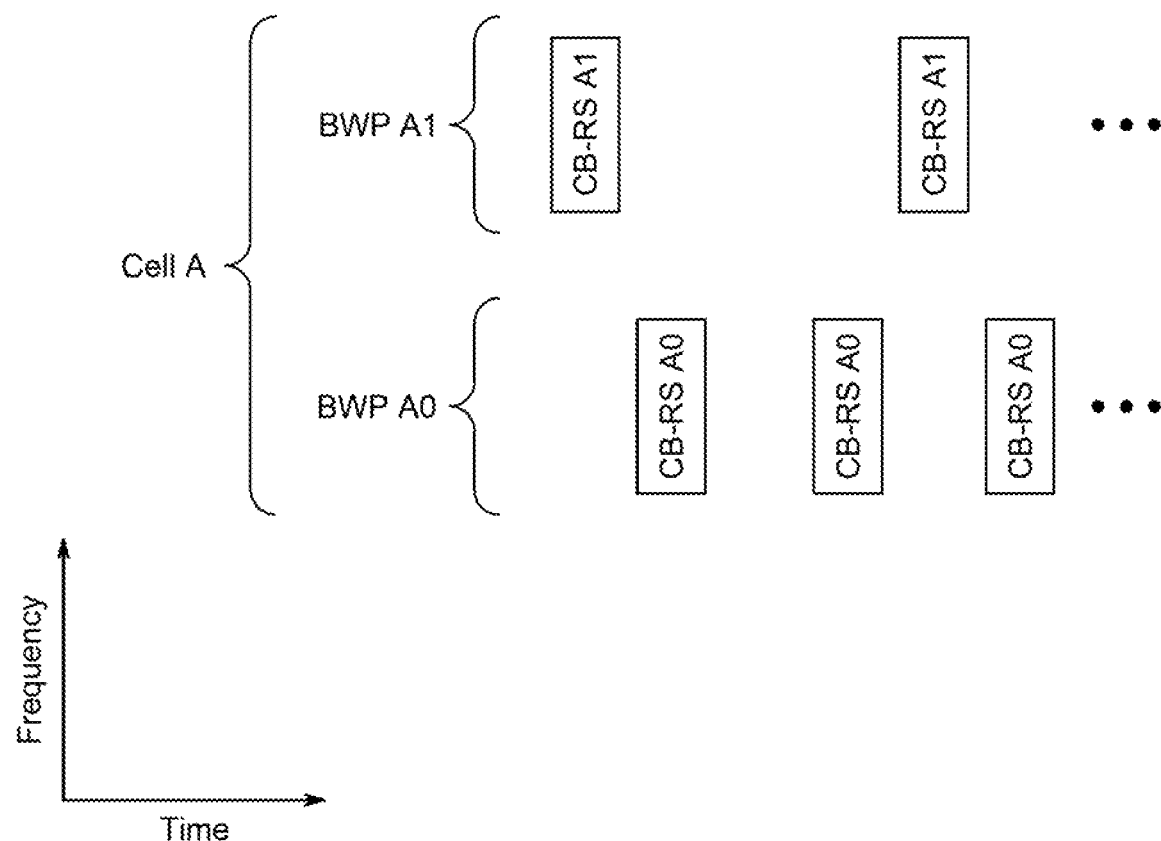
FIG. 2 shows a monitored cell configured with two BWPs for a UE in accordance with an exemplary embodiment.

FIG. 2 illustrates an exemplary embodiment that CB-RS for a monitored cell ("Cell A"), i.e. a cell for which the UE performs BFD, are configured and transmitted on the monitored cell. Monitored Cell A is configured with two BWPs (A0 and A1) for a UE. Each BWP contains its own CB-RS(s), which can be used for NBI if beam failure is detected. If, for instance, BWP A1 is active when beam failure is detected on cell A, then the UE uses the CB-RS configured for BWP A1 for NBI, i.e. "CB-RS A1". Note that "CB-RS A1" may represent a set of CB-RS, e.g. up to 16, 32, 63 or 64 different CB-RS. Although the set of CB-RS can be any number of different CB-RS. In the exemplary embodiment shown in FIG. 2, note that only one BWP per cell (one DL BWP and/or one UL BWP) is active at a time, so this figure illustrates what is configured rather than what is actually transmitted or what the UE may assume is transmitted.

Figure 3:
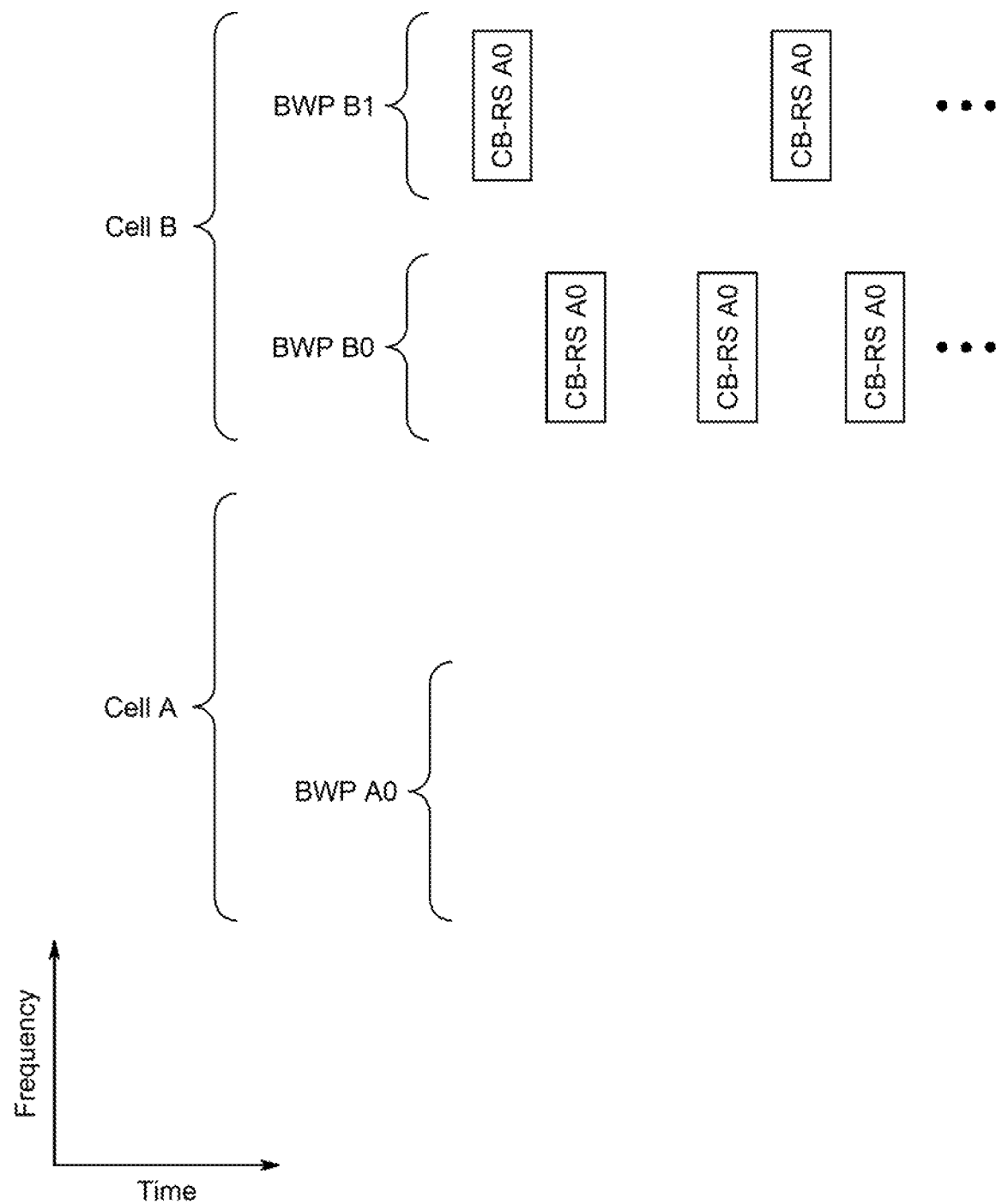
FIG. 3 shows a monitored cell configured with one BWP for a UE and another cell configured with two BWPs for a UE with CB-RSs corresponding to beam failure recovery of the monitored cell in accordance with an exemplary embodiment.

FIG. 3 illustrates an exemplary embodiment that CB-RS for a monitored cell ("Cell A"), i.e. a cell for which the UE performs BFD, are configured on another cell ("Cell B"). FIG. 3 also illustrates the monitored Cell A with BWP A0 for a UE. The BWP A0 is RRC configured with CB-RS on another cell (Cell B), which can be used for NBI if beam failure is detected on Cell A and BWP A0. If beam failure is detected on cell A and BWP A0, then the UE uses the CB-RS configured for BWP A0 for NBI, which in the example are configured and transmitted on Cell B ("CB-RS A0"). Note that "CB-RS A0" may represent a set of CB-RS, e.g. up to 16, 32, 63 or 64 different CB-RS. Although the set of CB-RS can be any number of different CB-RS. In the exemplary embodiment shown in FIG. 3, note that only one BWP per cell (one DL BWP and/or one UL BWP) is active at a time, so the figure illustrates what is configured rather than what is actually transmitted or what the UE may assume is transmitted.

In an exemplary embodiment, NBI is performed, at least partly, after BFRQ transmission, or after transmission of a part of BFRQ. For example, one or more of the configured CB-RS could be aperiodic and/or semi-persistent RS, e.g. CSI-RS. For example, the RS might not be transmitted at the time of beam failure. In an exemplary embodiment, the UE indicates beam failure and/or an index of a failed cell/CC in a first part of BFRQ. Subsequently, the network could trigger/activate one or more CB-RS for the UE, e.g. aperiodic and/or semi-persistent RS, to facilitate UE NBI. Subsequently, the UE indicates a new beam, if identified, in a subsequent BFRQ part.

Beam Failure Recovery Request (BFRQ)

Upon beam failure detection, the UE may transmit a BFRQ. The BFRQ may be transmitted, for example, on the monitored cell, on another cell (e.g. an SpCell) or on multiple cells. The BFRQ may, for example, indicate to the network one or more of the following:

that the UE has detected a beam failure, and/or
on which cell and/or CC the UE has detected beam failure, and/or
an indication of one or more new beam(s), and/or
a measurement result of one or more beams, e.g. new beam(s), for example, L1-RSRP, and/or
an indication that no new beam with measurement result above/below a threshold was found, e.g. no new beam with RSRP above a threshold was found.

That a UE has detected a beam failure may be explicitly indicated, e.g. a bit in an UL message, and/or implicitly indicated, e.g. by the transmission of the BFRQ, or parts thereof.

In an exemplary embodiment, the UE explicitly and/or implicitly indicates on which cell/CC that the UE has detected beam failure. The indication may be, for example, in the form of a cell index and/or CC index, e.g. a serving cell index or an index among monitored cells. An explicit indication may be, for example, in the form of one or more bits included in an UL message that is a part of the BFRQ, e.g. in a PUSCH or a PUCCH. An implicit indication of failed cell and/or CC is, for example, an association between different time-, frequency- and/or code resources for BFRQ transmission (or parts thereof) with a certain cell and/or CC, or groups thereof. For example, different PUCCH resources may be associated with different cells, so that if a UE transmits a PUCCH on a particular PUCCH resource, it indicates that the cell associated with that resource has failed. In an exemplary embodiment, different DMRS ports and/or different DMRS sequences may be associated with different cells, so that if a UE transmits BFRQ with a particular DMRS port and/or DMRS sequence, it indicates that the cell associated with that DMRS port and/or DMRS sequence has failed.

The network can configure one or more threshold(s) for NBI, e.g. a threshold specific to a BWP in a monitored cell, or a threshold specific to a monitored cell. A threshold can, for example, be in the form of an L1-RSRP, L3-RSRP, RSRQ, L1-SINR, L3-SINR and/or hypothetical PDCCH BLER, etc.

In an exemplary embodiment, a UE may select a candidate beam as a new beam if the measurement result, e.g. L1-RSRP, for the corresponding CB-RS is above (or alternatively equal to or above) the applicable threshold, e.g. the threshold configured for an active BWP of the monitored cell. In an exemplary embodiment, if there are multiple candidate beams that the UE can select, e.g. since multiple CB-RS L1-RSRP are above the threshold, it may be up to the UE to select one or multiple of these as new beam(s).

If no candidate beam could be selected, the UE might not indicate one or more new beams. Instead, it can, for example, be explicitly or implicitly indicated by the UE to the network that no candidate beam could be selected as a new beam. An explicit indication may for instance be a bit in a BFRQ message, or a certain new beam index reserved to indicate "no new beam identified". An implicit indication may, for instance, be the absence of a new beam indication in a BFRQ message.

In an exemplary embodiment, new beam identification is associated with a timer, e.g. the timer beamFailureRecoveryTimer in the MAC layer, or a new timer, e.g. "newBeamIdentificationTimer". The timer value at which it expires may be configurable, e.g. by parameter beamFailureRecoveryTimer in BeamFailureRecoveryConfig IE. The timer could, for example, be started when a beam failure is declared at the MAC layer. The timer could, for example, be used to limit the delay between beam failure being declared and the transmission of BFRQ or the transmission of the first part of BFRQ such as a first PUCCH as described below. In an exemplary embodiment, the UE can transmit BFRQ (or at least a first part of BFRQ) at a first available opportunity to do so, if the timer has expired. The UE may transmit BFRQ before expiration of the timer, for example, if it has found a new beam, for example, a candidate beam with RSRP above the threshold. For the case that the UE has not found a candidate beam with RSRP above the threshold, e.g. after timer expiration, the UE may indicate to the network that no new beam was identified. In an exemplary embodiment, the BFRQ may consist of one or more UL transmissions, which could also be called BFRQ parts.

BFRQ may consist of a single PUCCH transmission. For instance, an uplink control information (UCI) included in a PUCCH could explicitly include one or more of the pieces of information discussed above. In an exemplary embodiment, the selected PUCCH resource may implicitly indicate one or more pieces of information discussed above, e.g. the index of the failed cell/CC. In an exemplary embodiment, the PUCCH resource(s) is dedicated to BFRQ and in an exemplary embodiment it is shared with PUCCH for other purposes, e.g. CSI reporting, HARQ ACK/NACK, scheduling request, etc.

BFRQ may, for example, consist of a single PUSCH transmission. In an exemplary embodiment, the PUSCH resources are allocated with a configured grant. In an exemplary embodiment, the PUSCH resources are dynamically allocated with a downlink control information (DCI) included in a PDCCH.

In an exemplary embodiment, BFRQ may be included in a PUSCH in the form of a MAC control element (MAC CE). In an exemplary embodiment, BFRQ may be included in a PUSCH in the form of a UCI piggybacked in a PUSCH transmission.

For example, BFRQ may comprise a first PUCCH transmission and a second UL transmission. In an exemplary embodiment, a UE can be configured with a set of PUCCH resources dedicated to BFRQ, e.g. PUCCH resources dedicated to scheduling request (SR) following beam failure. In an exemplary embodiment, the first PUCCH transmission explicitly and/or implicitly indicates a part of the information relevant to BFRQ, e.g. that the UE has experienced beam failure and/or the index of the failed cell/CC and/or if a new beam has been found. For example, the first PUCCH transmission can indicate that the UE has experienced beam failure on a cell. The first UL transmission can also be a request to be scheduled with a second UL transmission.

In an exemplary embodiment, a first UL transmission may be a PRACH. In an exemplary embodiment, the PRACH is dedicated to BFRQ. In an exemplary embodiment, the PRACH is shared with other purposes, e.g. with contention-based random access, which may be used for initial access to the cell.

The second UL transmission can be a second PUCCH, for example. A second PUCCH could explicitly and/or implicitly indicate a part of the information relevant to BFRQ, e.g. information not conveyed by the first PUCCH or PRACH, e.g. index of the failed cell/CC and/or new beam information, if selected. In an exemplary embodiment, the first PUCCH is transmitted on a resource dedicated to BFRQ. In an exemplary embodiment, the second PUCCH is triggered by a DL transmission following the first PUCCH, e.g. a DCI.

The second UL transmission can be a PUSCH, for example. It could explicitly indicate a part of the information relevant to BFRQ, e.g. information not conveyed by the first PUCCH, e.g. index of the failed cell/CC and/or new beam information, if selected. In an exemplary embodiment, the first PUCCH is transmitted on a resource dedicated to BFRQ. In an exemplary embodiment, the subsequent PUSCH is triggered by a DL transmission following the first PUCCH, e.g. a DCI that schedules the PUSCH that includes the second part of the BFRQ.

The first UL transmission can, for example, be a normal scheduling request (SR) that is not dedicated to BFRQ. The SR may be followed by a DL transmission, e.g. a DCI that schedules a PUSCH or a PUCCH that includes the second part of the BFRQ. The PUSCH may explicitly include the second part of the BFRQ as a MAC CE and/or piggybacked as a UCI.

In an exemplary embodiment, the first SR might not be considered as part of the BFRQ. Instead, the BFRQ is only carried in the subsequent UL transmission, e.g. in the following PUSCH transmission. In this case, the PUSCH contains all information relevant to BFRQ, for example, explicitly as a MAC CE and/or piggybacked as a UCI.

In an exemplary embodiment, the first UL transmission may be a PUCCH, e.g. an SR, transmitted on either a PUCCH resource dedicated to BFRQ or a PUCCH resource shared with other purposes, e.g. a PUCCH resource for regular SRs.

In an exemplary embodiment, the BFRQ is conveyed through a 2-step RACH procedure, e.g. in the first step, also called message A. In an exemplary embodiment, the first step comprises a PRACH transmission followed by a PUSCH transmission. In an exemplary embodiment, the BFRQ is carried by the PRACH and the PUSCH. In an exemplary embodiment, the BFRQ is carried by the PUSCH. The PUSCH may explicitly include the BFRQ, or a part thereof, as a MAC CE and/or piggybacked as a UCI.

In various examples, a UE can simultaneously report beam failure on multiple cells (or CCs), e.g. by including multiple cell/CC indices in a BFRQ. Similarly, a UE may simultaneously report new beam information for multiple cells/CCs. In an exemplary embodiment, the multiple cells/CCs are from the same cell group, e.g. MCG/SCG. In an exemplary embodiment, the multiple cells/CCs are from different cell groups. The different cells (of the corresponding signals/channels) may be quasi co-located in some cases and not quasi co-located in some cases. Such multi-cell/CC reporting may, for example, be achieved by including information for multiple cells/CCs in the same MAC CE or the same UCI. Such reporting may, for example, be achieved by including multiple MAC CEs in a PUSCH, where a MAC CE includes information for a failed cell.

A UE can, for example, perform measurements on CB-RS after detecting beam failure, in order to select a new beam. A UE can, for example, perform measurements on CB-RS before detecting beam failure. A UE can, for example, perform measurements on CB-RS before and after detecting beam failure. It can be noted that RS configured as CB-RS may be used for other purposes, and a UE may be required to perform measurements on the RS for other purposes, such as beam management, intra-cell measurements, etc. In an exemplary embodiment, a UE is not required to perform candidate beam detection and measurement outside an active DL BWP.

Exemplary High-Level UE Procedure

Upon beam failure, the UE may need to switch BWP in the failed cell and determine which candidate beam to select as new beam, if any. An exemplary high-level description of such a procedure is described in FIG. 4. Compared to conventional technology, the exemplary procedure adds one or more additional steps, e.g. steps S410 and/or S412, in which the UE switches BWP and/or the UE selects a set C2 of CB-RS, which may be different from a configured set C1. The new beam, if any, can be selected from the set C2. The UE may also indicate that no new beam was identified in the set C2. The steps are further described below. Additional details and examples are described in the section below entitled "UE Procedure Examples with more Details and Variations."

In various exemplary embodiments, one or more parameters can be configured or is configured. This can, for example, mean that the parameter is a mandatory parameter within a certain configuration, e.g. an IE, or that the parameter is an optional parameter within a certain configuration, e.g. an IE.

Various exemplary embodiments of the steps are described below. In some examples, one or more of the steps can be omitted and in some examples the order of some of the steps can be changed. Other steps not described here may be inserted into the procedure.

Step S402: The procedure starts. This step may include various steps to connect to a cell, obtain an RRC configuration from the network, etc.

Step S404: The UE is configured with one or more set(s) (C1) of CB-RS. C1 can, for example, be configured per BWP, e.g. DL BWP and/or UL BWP, in a cell, e.g. a monitored cell (or to be monitored).

Step S406: The UE performs beam failure detection on the monitored cell.

Step S408: The UE detects beam failure on the monitored cell, e.g. on the MAC layer after a number of indications from the physical layer.

Step S410: The UE switches BWP. For example, the UE switches DL BWP on the monitored cell, if needed.

Step S412: The UE determines a set (C2) of CB-RS, to be used for selection of a new beam, if any, in following steps. In exemplary embodiment, C2 can be a subset of C1.

Step S414: The UE determines if any CB-RS in the set C2 meets the criterion to be selected as a new beam, for example, the corresponding measurement result is above a threshold (e.g., a predetermined threshold).

Step S416: If the UE has determined that at least one CB-RS meets the criterion, the UE can select one of those CB-RS as a new beam to be indicated to the network.

Step S418: The UE can indicate the selected new beam to the network, e.g. in a BFRQ.

Step S420: If the UE has determined in step S414 that no CB-RS meets the criterion, the UE can indicate to the network that no CB-RS meets the criterion, e.g. in a BFRQ.

UE Procedure Examples with More Details and Variations

In this section, additional examples of a UE procedure are described. For clarity and simplicity, some examples described under one of the steps involve aspects or actions also related to other steps. Hence, the headings below (Step S404, Step S406, etc.) can be seen as only a rough indication of the focus of the examples in the corresponding subsection. The immediate section below includes many examples regarding the UE configuration. However, the corresponding UE functionality may be described in more detail in a later section, e.g. the section regarding step S410 or step S412.

Step S404: The UE is Configured with a Set (C1) of CB-RS

The UE is configured with one or more set(s) (C1) of CB-RS. In an exemplary embodiment, C1 is configured per BWP, e.g. DL BWP and/or UL BWP, in a cell/CC, e.g. a monitored cell/CC (or to be monitored).

For instance, C1 can be a set of RS (representing candidate beams) configured for a DL BWP, from which the UE may select a new beam upon beam failure on the DL BWP.

A UE can be provided by the network with a configuration for candidate beams, new beam identification, etc., henceforth called a "BFR config" for simplicity. In an RRC specification, BFR for an SCell may be configured by, for example, an IE also used for SpCell BFR, e.g. BeamFailureRecoveryConfig, or an IE used only for SCell BFR, e.g. BeamFailureRecoveryConfigSCell or similar. The BFR config may also be divided into multiple parts, for example, one part that is applicable to a cell, e.g. the monitored cell, for example, BeamFailureRecoveryConfigSCell, and one part that is applicable to a BWP of a cell, e.g. a BWP of the monitored cell. A configuration applicable to a BWP can, for example, be configured under a per-cell BFR configuration (e.g. under BeamFailureRecoveryConfigSCell) or separately under the BWP configuration (e.g. under BWP-DownlinkDedicated or under BWP-UplinkDedicated) A configuration applicable to a BWP can, for example, be used when the corresponding BWP is active. A BFR config can, for example, be included in the UE's configuration of a DL BWP of a serving cell/CC. In another example, a BFR config can be included in the configuration of an UL BWP. Various examples herein use the terminology "BWP" that can mean "DL BWP", "UL BWP" and/or "DL and/or UL BWP," etc. A BFR config may include configuration of:

A set, e.g. a list, of CB-RS, e.g. the set
  A CB-RS can, for example, be a periodic or semi-persistent non-zero power CSI-RS (NZP-CSI-RS), e.g. a NZP-CSI-RS used for beam management, or an SSB.
  The actual configuration of the CB-RS (e.g. the RS time-frequency resources, periodicity, sequence, etc.) might not be directly included in the BFR config. Instead, the BFR config may include the indices of the RSs, e.g. NZP-CSI-RS resource indices (e.g. NZP-CSI-RS-ResourceId) and/or SSB indices (e.g. SSB-Index), whereas the actual RS configuration can be provided elsewhere, e.g. in a CSI-MeasConfig in the ServingCellConfig.
A threshold for selecting a candidate beam as new beam, e.g. an L1-RSRP threshold.
One or more timer values, e.g. for a timer after whose expiry a UE could report that no new beam was identified.
  In some cases, multiple timer values are configured. Each timer value applies to a subset of the configured CB-RS, e.g. in the set C1. For the cases that C2 is a subset of C1, the UE may apply the longest or shortest timer value configured for any CB-RS in C2. In exemplary embodiment, the UE can report that no new beam was identified when the UE has either determined that for each CB-RS in C2: CB-RS quality is not good enough (e.g. L1-RSRP below threshold) or the timer configured for the CB-RS has expired.

BFRQ, e.g.
  indication of one or more cells and/or BWPs on which the BFRQ may be transmitted.
  dedicated PUCCH resources for BFRQ transmission, or a part thereof, e.g. dedicated PUCCH resources for the first part of a multi-part BFRQ.

A UE may be configured with multiple sets of CB-RS, e.g. different sets in different BWPs (e.g. DL BWPs) of a cell, respectively. A UE may also be configured with different sets in different cells, e.g. serving cells. The set(s) of CB-RS may need to be reconfigured as the UE moves. This may happen anytime, e.g. after step S406 or after step S408, etc.

In some cases, no CB-RS are configured for a first BWP in a first cell to be monitored. For example, C1 may be empty or there is no BFR config configured for the BWP. This could for instance mean that the UE does not perform link recovery on the cell, e.g. BFD, when the first BWP is active. In other words, the cell would not be monitored for beam failure. In other cases, no CB-RS configured for the first BWP could for instance mean that the UE upon beam failure can switch to a second BWP in the first cell, i.e. the monitored cell. The second BWP could, for example, be an initial DL BWP (e.g. as configured by initialDownlinkBWP), an initial UL BWP (e.g. as configured by initialUplinkBWP), a first active DL BWP (e.g. as configured by firstActiveDownlinkBWP-Id), a first active UL BWP (e.g. as configured by firstActiveUplinkBWP-Id) or a default DL BWP (e.g. as configured by defaultDownlinkBWP-Id).

The second BWP could, for example, be a BWP configured to be a fallback BWP at beam failure (e.g. a DL BWP in the cases that a BFD config can be configured for a DL BWP and/or a UL BWP in the cases that a BFD config can be configured for a UL BWP). For example, it could be configured by an RRC parameter in ServingCellConfig, for instance named BFRDownlinkBWP, indicating a BWP Id, e.g. with conditional presence "SCellOnly". In another example, it could be configured by an RRC parameter in the BFR config, for instance named BFRDownlinkBWP, indicating a BWP Id, e.g. with conditional presence "SCellOnly".

New Beam Identification in the Monitored Cell

In an exemplary embodiment, the UE monitors a first cell for beam failure (monitored cell) and conducts new beam identification based on CB-RS transmitted in the first cell. CB-RS, e.g. all CB-RS, in C1 configured for a BWP, e.g. DL BWP, in a first cell can, for example, refer to RS transmitted in the same BWP (in the first cell), e.g. DL BWP.

CB-RS, e.g. all CB-RS, in C1 configured for a first BWP (e.g. a DL BWP) in a first cell can, for example, refer to RS transmitted in a second BWP (in the first cell), e.g. a DL BWP, where the second BWP can be different from the first BWP, for example, if the BWPs are associated with different BWP identities (Id). This can, for example, be achieved by configuring a BWP Id (referring to the second BWP) in the BFR config for the first BWP. In some cases, either such a BWP Id or a list of CB-RS transmitted on the second BWP could be configured. In an exemplary embodiment, either such a BWP Id or a BFR config could be configured. If a BWP Id is configured, it could for instance mean that the UE should switch to the second BWP at beam failure, and proceed with NBI on that second BWP, e.g. based on the BFR config in the second BWP. Note that the BFR config of the second BWP could configure CB-RS(s) that could be transmitted in the first cell or in a second cell or in multiple cells. Also note that the BFR config of the second BWP could point to a third BWP in the first cell, etc. A benefit of such a solution could be significantly reduced (re-)configuration overhead (e.g. RRC signaling) of CB-RS(s), etc., since CB-RS(s), etc., only on the second BWP would have to be reconfigured, instead of both on the first and second BWP.

In an exemplary embodiment, a BWP Id (of the second BWP) is not explicitly configured in a configuration of a first BWP. Instead, the UE obtains the identity of the second BWP, for example, by determining that it is a BWP on which CB-RS(s), etc., is configured. In an exemplary embodiment, the first BWP is active at beam failure on the cell, but the first BWP is not configured with, for example, a BFR config and/or a set CB-RS. In this case, the UE determines another BWP, i.e. the second BWP, of the cell for which, for example, a BFR config and/or a set of CB-RS is configured. The UE may then use the configuration of BFR and/or CB-RS for the NBI, e.g. by switching to the second BWP and/or just applying the configuration. More examples and details are discussed under step S410.

New Beam Identification in Another Cell than the Monitored Cell

In an exemplary embodiment, the UE monitors a first cell for beam failure (monitored cell) and conducts new beam identification based on CB-RS transmitted in a second cell, where the second cell can be different from the first cell.

CB-RS, e.g. all CB-RS, in C1 configured for a BWP, e.g. DL BWP, in the first cell can, for example, refer to RS transmitted on the second cell/CC.

In an exemplary embodiment, RS transmitted in the second cell/CC can be configured as CB-RS in the first cell by configuring one or more RS index(es) and one or more cell index(es) (referring to one or more second cell(s)/CC(s)). For example, RS index(es) and cell index could be configured per BWP, e.g. DL BWP, of the first cell. This would mean that different configurations of CB-RS (and thereby sets C1) could be used depending on which BWP that is active in the first cell.

In an exemplary embodiment, a cell index can be configured for each CB-RS (e.g. RS index) in a BFR config, e.g. by including a cell index (e.g. serving cell index) within a BFR-SSB-Resource IE, BFR-CSIRS-Resource IE, BFR-SCell-SSB-Resource IE, BFR-SCell-CSIRS-Resource IE or similar. This can mean that CB-RS(s) configured for the same BWP in the first cell can be configured to be in different cells, i.e. different second cells. In other words, C configured for a BWP can include RSs from multiple different cells/CCs. If the cell index parameter, which can be optional, is omitted in the configuration of an RS, it can, for example, mean that the configured RS is in the first cell, e.g. the configured RS index refers to an RS configured in the first cell.

In an exemplary embodiment, a cell index (e.g. serving cell index) can be configured jointly for multiple CB-RS (e.g. RS indices) in a BFR config. This can mean that multiple configured CB-RS, e.g. all RSs in a list of configured CB-RS defining C1, refer to RSs in the same second cell.

In some cases, RS index(es) and cell index(es) for CB-RS could be configured in the serving cell configuration of the first cell, i.e. per cell configuration rather than per BWP configuration. This can mean that the same CB-RS/cell configuration is applicable to each relevant BWP, e.g. each DL BWP, of the first cell.

In an exemplary embodiment, the CB-RS configuration of the first cell (e.g. per cell or per BWP) does not explicitly configure RS(s), e.g. RS index(es). Instead, the configuration indicates the second cell. This can, for example, imply that the UE should apply the CB-RS configuration (or the whole or parts of the BFR config) of the second cell. For instance, it can mean that the CB-RS configuration of an active BWP, e.g. the active DL BWP, of the second cell is used for NBI upon beam failure in the first cell.

In an exemplary embodiment, the first and second cell(s)/CC(s) need to be in the same frequency band, e.g. spanning non-overlapping bandwidths within the same frequency band. In an exemplary embodiment, they can be in different frequency bands.

The UE can in many cases be RRC configured during one or more of the subsequent steps. In an exemplary embodiment, such a reconfiguration could reset any ongoing beam failure recovery procedure.

Step S406: The UE Performs Beam Failure Detection on the Monitored Cell.

The UE performs beam failure detection on the monitored cell. In an exemplary embodiment, the UE does not need to perform BFD, BFR, and/or link recovery on a cell, e.g. an SCell, for example, when some parts of the configuration related to link recovery is not configured, e.g. for an active BWP of the cell. Such configuration parts could, for example, include BFR config and parameters therein such as a configuration of CB-RS, various thresholds related to link recovery and/or timers related to link recovery, etc.

Step S408: The UE Detects Beam Failure on the Monitored Cell.

The UE detects beam failure on the monitored cell, e.g. on the MAC layer after a number of indications from the physical layer. Further details and various examples of beam failure detection was given in the section above entitled "New Beam Identification (NBI)."

In an exemplary embodiment, the UE starts beam failure recovery upon beam failure detection on the monitored cell. In an exemplary embodiment, the UE performs other actions between beam failure detection and the start of beam failure recovery, for example, BWP switching and/or determining a set (C2) of CB-RS.

Step S410: The UE Switches BWP.

In an exemplary embodiment, the UE switches DL BWP and/or UL BWP upon beam failure detection on the monitored cell. In some cases, the UE does not switch DL BWP or UL BWP upon beam failure detection on the monitored cell, e.g. in example procedures in which this step is omitted. A monitored cell on which beam failure has been detected but not recovered can be called "a failed cell".

If CB-RS are configured in an UL BWP, the UE can, for example, switch its active DL BWP of the failed cell to the DL BWP with the same BWP index as the active UL BWP of the failed cell.

As also described above, in an exemplary embodiment, no CB-RS are configured for a first BWP in a first cell to be monitored. For example, no CB-RS are configured in a list or there is no BFR config configured for the BWP. This could for instance mean that the UE does not perform link recovery on the cell, e.g. BFD, BFR, and/or link recovery, at least when the first BWP is active. In other words, the cell would not be monitored for beam failure.

In other cases, no CB-RS configured for the first BWP can for instance mean that the UE upon beam failure can switch to a second BWP in the monitored cell. The second BWP can, for example, be an initial DL BWP (e.g. as configured by initialDownlinkBWP), an initial UL BWP (e.g. as configured by initialUplinkBWP), a first active DL BWP (e.g. as configured by firstActiveDownlinkBWP-Id), a first active UL BWP (e.g. as configured by firstActiveUplinkBWP-Id) or a default DL BWP (e.g. as configured by defaultDownlinkBWP-Id). The second BWP can, for example, be a BWP configured to be a fallback BWP at beam failure (DL BWP in the cases that a BFD config can be configured for a DL BWP and UL BWP in the cases that a BFD config can be configured for a UL BWP). For example, it can be configured by an RRC parameter in ServingCellConfig, for instance named BFRDownlinkBWP, indicating a BWP Id, e.g. with conditional presence "SCellOnly". In an exemplary embodiment, it could be configured by an RRC parameter in the BFR config, for instance named BFRDownlinkBWP, indicating a BWP Id, e.g. with conditional presence "SCellOnly".

If a BWP index is configured, it can for instance mean that the UE should switch to the second BWP upon beam failure, and proceed with NBI on that second BWP, e.g. based on the BFR config in the second BWP. In an exemplary embodiment, the BFR config in the second BWP can configure CB-RS(s) that could be in the first cell or in a second cell or in multiple cells, as also a BFR config in the first BWP could. In an exemplary embodiment, the UE switches to the second BWP if the BFR config of the second BWP configures CB-RS transmitted in the second BWP, but not if the BFR config of the second BWP configures CB-RS transmitted on another BWP in the first cell (e.g. by in turn referring to a third BWP in the first cell) or on a second cell. In the case that the BFR config of the second BWP refers to a third BWP in which the CB-RS are transmitted, the UE could switch to the third BWP. In the case that the BFR config of the second BWP configures CB-RS on a second cell, the UE can remain on the first BWP in the first cell.

A benefit of a solution with a reference to a second BWP or a second cell for NBI can be significantly reduced (re-)configuration overhead (e.g. RRC signaling) of CB-RS(s), etc., since CB-RS(s), etc., only one e.g. the second BWP would have to be reconfigured, instead of both on the first and second BWP.

In an exemplary embodiment, a BWP index (of the second BWP) is not explicitly configured in a configuration of a first BWP. Instead, the UE obtains the identity of the second BWP, for example, by determining that it is a BWP on which a BFR config (or parts thereof), e.g. CB-RS(s), etc., is configured. For example, if the UE's active BWP, e.g. active DL BWP, does not have configured CB-RSs or a BFR config, the UE can upon beam failure for instance switch to a BWP with configured CB-RS or BFR config. If CB-RS or BFR configs are configured on multiple BWPs in a cell (e.g. monitored cell), the second BWP, can be selected by the UE from the multiple BWPs based on a rule, for example, the BWP among the multiple BWPs with the lowest BWP index.

In an exemplary embodiment, a DL BWP can be configured with a CORESET for BFR, e.g. for receiving a beam failure recovery response after BFRQ. In an exemplary embodiment, the second BWP could be a DL BWP with a configured CORESET for BFR.

In an exemplary embodiment, the set of CB-RS C1 is RRC configured per BWP, e.g. per DL BWP. Hence, the set C1 can depend on the active BWP, e.g. active DL BWP. For example, if the UE stays on the first BWP upon beam failure, C1 is based on the BFR config for the first BWP. If the UE instead switches to a second BWP upon beam failure, C1 is based on the BFR config for the second BWP.

Step S412: The UE Determines a Set (C2) of CB-RS.

The UE determines a set (C2) of CB-RS, to be used for selection of a new beam, if any, in the following steps. For instance, C2 can be a subset of C1.

The set of CB-RS C1 can be configured, e.g. via RRC signaling, prior to detection of beam failure. As described above, the set C1 can contain RSs (or references to RSs) transmitted on various cells and BWPs, e.g. DL BWPs. In an exemplary embodiment, e.g. when different RSs in C1 are transmitted in different cells and/or BWPs, the RSs may use different numerologies. However, the transmission of an RS may be switched on during some time durations and switched off during some time durations and/or a UE may assume that an RS may be switched on during some time durations and switched off during some time durations. For example, for a periodic signal, it can be configured, for example, with a periodicity, a time offset to a reference time (e.g. system frames), a signal duration, etc. If the signal transmission is switched on, the UE can assume that the signal is transmitted according to its configuration, e.g. with the configured periodicity, offset and duration. In an exemplary embodiment, a signal being switched on does not imply that the UE can assume its transmission outside the configured transmission occasions. If the signal transmission is switched off, the UE cannot assume that the signal is transmitted according to its configuration. In many cases, the network may still transmit a signal even though it is switched off for a UE. In an exemplary embodiment, a signal may be switched off for a UE and switched on for another UE.

An RS may be switched off for a UE for various reasons, for example, one or more of the following.

1. The cell (e.g. a serving SCell) on which the RS is transmitted is deactivated for the UE.
    a. In an exemplary embodiment, this includes other cell states (e.g. a dormant cell state) for which the UE cannot assume that a configured RS is transmitted, or for which the UE is not required to measure an RS according to a configuration.
2. The BWP (e.g. a DL BWP) on which the RS is transmitted is inactive for the UE.
3. The RS is configured as semi-persistent and is in a deactivated state.
4. The UE can detect that the RS, e.g. periodic RS, could not be transmitted by the network since the network did not obtain channel access at the time of RS transmission.
5. When DRX is configured for the UE, the RS transmission occasion is outside the DRX Active Time.
6. The UE has obtained an indication of UE power saving from the network, e.g. by receiving a signal (e.g. "go to sleep" signal) or not receiving a signal (e.g. "wake up signal" or "stay awake" signal).

A periodic RS may be switched on for a UE, for example, if it is transmitted in an active DL BWP. A semi-persistent RS may be switched on for a UE, for example, if the RS is in an activated state and the RS is transmitted in an active DL BWP.

Furthermore, there may be various reasons why a UE is not required or expected to perform new beam identification on a CB-RS, for example, one or more of the following.

7. The RS is not quasi co-located, e.g. with respect to a spatial parameter, with an RS in the active TCI state of any CORESET configured in the UE active BWP.
    a. An active TCI state of a CORESET indicates QCL between one or more RS(s) and the CORESET.
8. The RS is not quasi co-located, e.g. with respect to a spatial parameter, with an RS in the active TCI state of any CORESET configured in any active BWP of the UE, e.g. any active BWP of the UE in the frequency band in which the RS is transmitted. A UE with multiple activated serving cells may have multiple activated DL BWPs, e.g. one per activated serving cell, and multiple activated UL BWPs, e.g. one per activated serving cell.
9. When DRX is configured for the UE, the RS transmission occasion is outside the DRX Active Time.
10. The UE has obtained an indication of UE power saving from the network, e.g. as described in bullet 6 above.

The set of CB-RS C2 is, for example, a subset of C1. In an exemplary embodiment, C2 is the subset of CB-RS in C1 that are not switched off. In an exemplary embodiment, C2 is the subset of CB-RS in C1 that are switched on. In some cases, C2 is the intersection or the union of
1. the subset of CB-RS in C1 that are not switched off, and
2. the set of CB-RS in C1, except the subset (e.g. set difference) of CB-RS in C1 on which the UE is not required or expected to perform NBI.

In an exemplary embodiment, C2 is the set of CB-RS in C1, except the subset (e.g. set difference) of CB-RS in C1 on which the UE is not required or expected to perform NBI.

In an exemplary embodiment, a UE determines a set of CB-RS C2 upon beam failure. In an exemplary embodiment, a UE determines a set of CB-RS C2 in relation to instances of beam failure detection or periodically. In an exemplary embodiment, a UE determines a set of CB-RS C2 upon beam failure and subsequent BWP switch. In an exemplary embodiment, a UE determines a set of CB-RS C2 when an RS in C1 is switched on or off. In an exemplary embodiment, a UE determines a set of CB-RS C2 when the UE is no longer required or expected to perform new beam identification on a CB-RS in C1 on which it was previously required or expected to perform new beam identification. In various examples, a UE determines a set of CB-RS C2 when the UE is required or expected to perform new beam identification on a CB-RS in C1 on which it was previously not required or expected to perform new beam identification. In an exemplary embodiment, a UE determines a set of CB-RS C2 at other times such that it is up to date at relevant time instances, e.g. upon beam failure.

In an exemplary embodiment, e.g. on unlicensed frequency bands, the network operates listen before talk (LBT), which means that the network sometimes might not be able to access the channel. For example, the network sometimes is not able to transmit one or more CB-RS, e.g. the CB-RS in C1 or a subset thereof, since channel access was not obtained by the network. In an exemplary embodiment, the UE can be explicitly (via GC-PDCCH and/or UE-specific PDCCH and/or PDCCH DMRS sequence) or implicitly (via signals such DMRS and/or corresponding PDCCH detection and/or other signals/channels) indicated whether the network (e.g. gNB) successfully acquired the channel or not. Hence, in an exemplary embodiment, the UE can determine that the CB-RS in C1, or a subset thereof, were not transmitted by the network. Then the UE may use another set of CB-RS C2, which may be a subset of CB-RS in C1 that the network could transmit.

Step S414: The UE Determines if any CB-RS in the Set C2 Meets the Criterion to be Selected as a New Beam.

The UE determines if any CB-RS in the set C2 meets a criterion to be selected as a new beam. The criterion can, for example, include that the corresponding CB-RS measurement result (e.g. L1-RSRP) is above a threshold, or equal to or above a threshold, where the threshold can be an RSRP value, for example.

Figure 4:
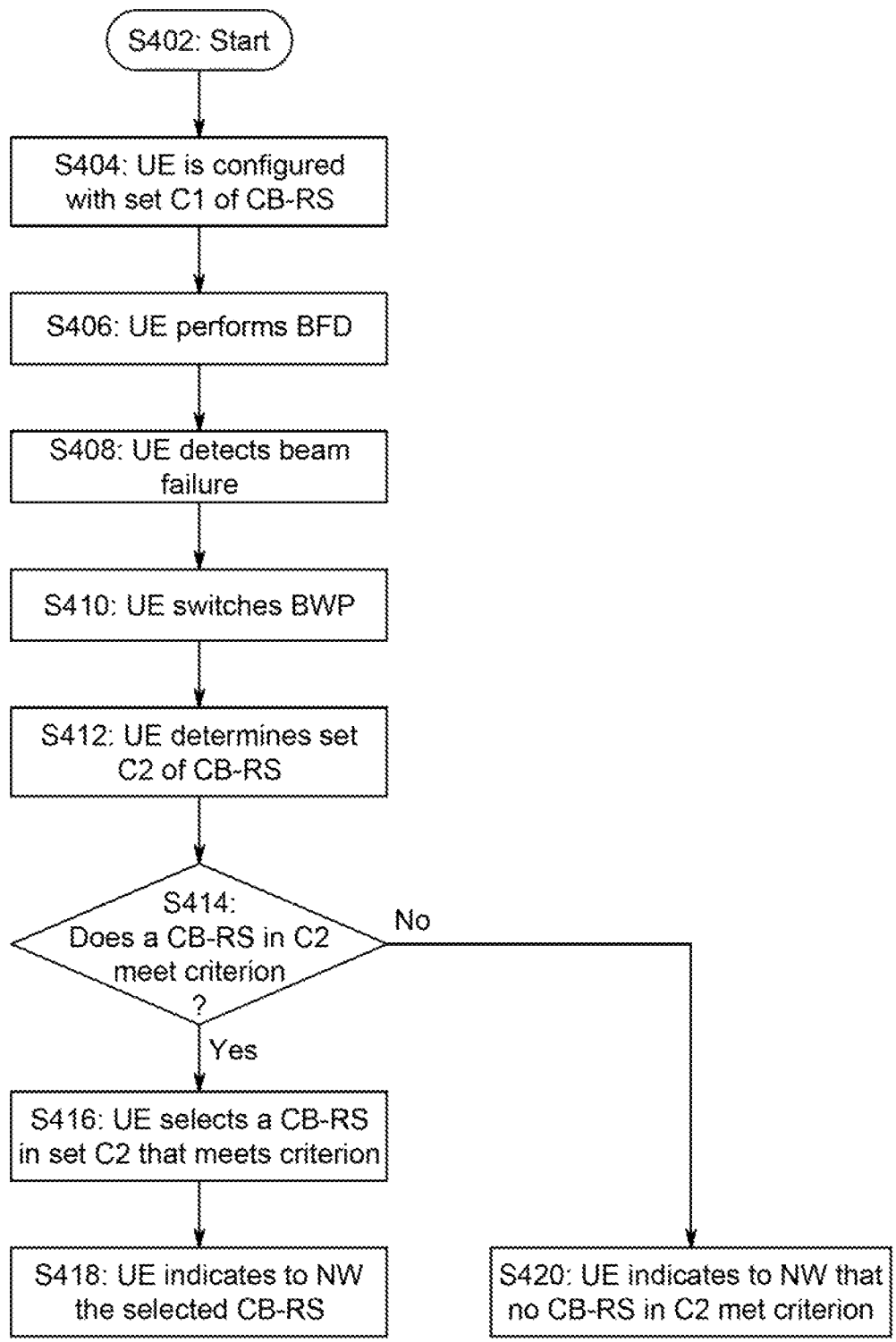
FIG. 4 shows a method performed by a UE for link recovery in accordance with an exemplary embodiment.

Note that FIG. 4 does not show an explicit step in which the UE performs measurements on CB-RS. In an exemplary embodiment, at least some measurements on at least some CB-RS, e.g. those in C1 and/or C2, are performed prior to step S404, S406, S408, S410, S412 or S414. In an exemplary embodiment, at least some measurements on at least some CB-RS, e.g. those in C2, are performed after step S412, e.g. between step S412 and step S414, or during step S414.

In an exemplary embodiment, the UE shall perform measurements on CB-RS in C2, such that the UE can determine if any of those CB-RS meets the new beam selection criterion.

In an exemplary embodiment, it is up to the UE to decide on which CB-RS in C2 it performs measurements prior to step S414. In this case, the UE may determine that no CB-RS in C2 meets the criterion even though the UE has not performed sufficient measurements on the relevant CB-RS.

In an exemplary embodiment, the set C2 is empty, e.g. if no CB-RS were configured in C1 or if the UE determined that no CB-RS in C1 is switched on. This situation can for instance imply that the UE determines that no CB-RS meets the criterion.

In an exemplary embodiment, C2 contains CB-RS from a second cell, other than the failed first cell. In an exemplary embodiment, the UE uses a threshold configured for the first cell. In an exemplary embodiment, the UE uses a threshold configured for the second cell. In an exemplary embodiment, the UE uses a threshold configured for the first cell if it is configured and otherwise a threshold configured for the second cell. In an exemplary embodiment, the UE uses a threshold configured for the second cell if it is configured and otherwise a threshold configured for the first cell. In an exemplary embodiment, there is a default threshold applied if a threshold is not configured.

In an exemplary embodiment, C2 contains CB-RS from multiple cells. In an exemplary embodiment, the UE uses a threshold configured for one cell (or a corresponding active BWP), e.g. the failed cell, when evaluating the criterion for each CB-RS in C2. In an exemplary embodiment, the UE uses thresholds configured for different cells (or corresponding active BWPs) when evaluating the criterion for the different CB-RS in C2. For example, for a CB-RS transmitted on a cell (or an active BWP), the UE uses the threshold configured for that cell (or BWP). For example, if C2 contains CB-RS transmitted on a first cell and CB-RS transmitted on a second cell, the UE uses a threshold configured for the first cell for the CB-RS transmitted on the first cell and a threshold configured for the second cell for the CB-RS transmitted on the second cell.

Step S416: The UE Selects One of Those CB-RS as a New Beam to be Indicated to the network.

If the UE has determined that at least one CB-RS meets the criterion, the UE e.g. selects one of those CB-RS as a new beam to be indicated to the network. In an exemplary embodiment, the UE can select multiple new beams to be indicated to the network, based on multiple CB-RS that meet the criterion or criteria.

Step S418 Indicate the Selected New Beam to the Network: The UE can.

The UE can indicate the selected new beam to the network, e.g. in a BFRQ. In some cases, also a measurement result, e.g. L1-RSRP, per new beam is included in the report to the network.

Step S420: The UE can Indicate to the Network that No CB-RS Meets the Criterion.

If the UE has determined in step S414 that no CB-RS, e.g. no CB-RS in C2 or no CB-RS in C1, meets the criterion, the UE can indicate to the network that no CB-RS meets the criterion, e.g. in a BFRQ.

In an exemplary embodiment, the electronic device is a UE (e.g., UE 102), such as a smartphone. In an exemplary embodiment, the circuitry of the electronic device (e.g., UE) can include at least one or more processor devices (e.g., CPUs 118). In an exemplary embodiment, the circuitry can also include one or more memories (e.g., memories 130, 132) storing computer executable instructions. In an exemplary embodiment, the circuitry can include one or more of the components shown in FIG. 1F.

In an exemplary embodiment, the electronic device (e.g., UE) receives data from the core network.

In an exemplary embodiment, an electronic device (e.g., UE 102) includes a transceiver (e.g., transceiver 120) configured to communicate with a network (e.g., core network 106); and circuitry (e.g., processor 118, non-removable memory 130, etc.). The circuitry is configured to perform beam failure detection on a monitored cell; detect a beam failure on the monitored cell; determine at least one new set of candidate beam reference signals (CB-RSs) from at least one set of CB-RS configured for the electronic device; determine if any CB-RS in the at least one new set of CB-RSs meets a criterion, and in a case it is determined that any CB-RS in the at least one new set of CB-RSs meets the criterion: select a beam corresponding to a CB-RS in the new set that meets the criterion as the new beam, and indicate the selected new beam to the network. In a case it was determined that no CB-RS in the new set of CB-RS meets a criterion, indicate to the network that no CB-RS in the at least one new set of CB-RSs meets the criterion.

In an exemplary embodiment, the determining of the new set of candidate beam reference signals (CB-RSs) from the set of CB-RS configured for the electronic device includes switching an active bandwidth part (BWP) from a first BWP of the monitored cell to a second BWP, and determining a new set of candidate beam reference signals (CB-RSs) from a set of CB-RS configured for the electronic device.

In an exemplary embodiment, the set of CB-RS configured for the electronic device is configured for an active BWP of the monitored cell.

In an exemplary embodiment, the criterion is an RS measurement result exceeding a threshold.

In an exemplary embodiment, CB-RSs excluded from the new set include at least one of: a reference signal (RS) in a deactivated cell, a RS in an inactive BWP, a deactivated semi-persistent RS, a RS not transmitted due to the network not gaining channel access, a RS outside a discontinuous reception (DRX) active time, and a RS transmission occasion is during a sleep time of the electronic device.

In an exemplary embodiment, CB-RSs excluded from the at least one new set include at least a reference signal (RS) in a deactivated cell.

In an exemplary embodiment, CB-RSs excluded from the at least one new set include at least a RS in an inactive BWP.

In an exemplary embodiment, a method performed by an electronic device includes: performing beam failure detection on a monitored cell; detecting a beam failure on the monitored cell; determining at least one new set of candidate beam reference signals (CB-RSs) from at least one set of CB-RS configured for the electronic device; determining if any CB-RS in the at least one new set of CB-RSs meets a criterion, and in a case it is determined that any CB-RS in the at least one new set of CB-RSs meets the criterion: selecting a beam corresponding to a CB-RS in the at least one new set that meets the criterion as the new beam, and indicating the selected new beam to the network. In a case it was determined that no CB-RS in the at least one new set of CB-RS meets a criterion, indicating to the network that no CB-RS in the at least one new set of CB-RSs meets the criterion.

In an exemplary embodiment, the determining of the at least one new set of candidate beam reference signals (CB-RSs) from the at least one set of CB-RS configured for the electronic device includes switching an active bandwidth part (BWP) from a first BWP of the monitored cell to a second BWP, and determining at least one new set of candidate beam reference signals (CB-RSs) from at least one set of CB-RS configured for the electronic device.

In an exemplary embodiment, each set of CB-RS is configured per BWP.

In an exemplary embodiment, the criterion is an RS measurement result exceeding a threshold.

In an exemplary embodiment, CB-RSs excluded from the at least one new set include at least one of: a reference signal (RS) in a deactivated cell, a RS in an inactive BWP, a deactivated semi-persistent RS, a RS not transmitted due to the network not gaining channel access, a RS outside a discontinuous reception (DRX) active time, and a RS transmission occasion is during a sleep time of the electronic device.

In an exemplary embodiment, CB-RSs excluded from the at least one new set include at least a reference signal (RS) in an inactive BWP.

In an exemplary embodiment, a non-transitory computer-readable medium includes computer-executable instructions, which when executed by an electronic device, cause the electronic device to: perform beam failure detection on a monitored cell; detect a beam failure on the monitored cell; determine at least one new set of candidate beam reference signals (CB-RSs) from at least one set of CB-RS configured for the electronic device; determine if any CB-RS in the at least one new set of CB-RSs meets a criterion, and in a case it is determined that any CB-RS in the at least one new set of CB-RSs meets the criterion: select a beam corresponding to a CB-RS in the at least one new set that meets the criterion as the new beam, and indicate the selected new beam to the network. In a case it was determined that no CB-RS in the at least one new set of CB-RSs meets a criterion, indicate to the network that no CB-RS in the at least one new set of CB-RSs meets the criterion.

In an exemplary embodiment, the determining of the at least one new set of candidate beam reference signals (CB-RSs) from the at least one set of CB-RS configured for the electronic device includes switching an active bandwidth part (BWP) from a first BWP of the monitored cell to a second BWP, and determining at least one new set of candidate beam reference signals (CB-RSs) from at least one set of CB-RS configured for the electronic device.

In an exemplary embodiment, each set of CB-RS is configured per BWP.

In an exemplary embodiment, the criterion is an RS measurement result exceeding a threshold.

In an exemplary embodiment, CB-RSs excluded from the at least one new set include at least one of: a reference signal (RS) in a deactivated cell, a RS in an inactive BWP, a deactivated semi-persistent RS, a RS not transmitted due to the network not gaining channel access, a RS outside a discontinuous reception (DRX) active time, and a RS transmission occasion is during a sleep time of the electronic device.

In an exemplary embodiment, CB-RSs excluded from the at least one new set include at least a reference signal (RS) in a deactivated cell.

In an exemplary embodiment, a system includes the electronic device described above and a base station, wherein the base station is configured to perform at least one of: transmit the configuration of the at least one set of CB-RS for the electronic device to the electronic device, transmit the at least one new set of CB-RS to the electronic device, and receive the indication of the selected new beam from the network or the indication that no CB-RS in the new set of CB-RSs meets the criterion.

In an exemplary embodiment, the at least one new set of CB-RSs is a subset of the at least one set of CB-RSs.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

The following [1]-[6] are incorporated herein by reference in their entireties:
[1] 3GPP TS 38.331, V15.5.0.
[2] 3GPP TS 38.213, V15.5.0.
[3] 3GPP TS 38.321, V15.5.0.
[4] 3GPP TS 38.133, V15.5.0.
[5] 3GPP TS 38.306, V15.5.0.
[6] 3GPP TS 38.214, V15.5.0.

What is claimed is:

1. A wireless transmit/receive unit (WTRU) comprising a processor configured to:
    receive a beam failure recovery (BFR) configuration from a base station of a network, wherein the BFR configuration is associated with a first bandwidth part (BWP) of a monitored cell and comprises a configuration of at least one set of candidate beam reference signals (CBRSs);
    detect a beam failure on the monitored cell;
    determine at least one new set of CB-RSs from the at least one set of CB-RSs configured for the WTRU, wherein the at least one new set of CB-RSs configured for the WTRU is associated with a second BWP of the monitored cell;
    switch from the first BWP of the monitored cell to a second BWP of the monitored cell using a BWP identity of the second BWP, wherein the BFR configuration that is associated with the first BWP indicates the BWP identity of the second BWP;
    determine if one or more CB-RS in the at least one new set of CB-RSs of the second BWP meets a criterion, and in a case it is determined that the one or more CB-RS in the at least one new set of CB-RSs meets the criterion:
    select one of the one or more CB-RS in the at least one new set of CB-RSs that meets the criterion as a new beam, and indicate the selected new beam to the network via the second BWP.

2. The WTRU of claim 1, wherein the criterion is an RS measurement result satisfying a threshold.

3. The WTRU of claim 1, wherein the processor of the WTRU is further configured to exclude from the at least one new set of CB-RSs at least one of:
a reference signal (RS) in a deactivated cell,
a RS in an inactive BWP,
a deactivated semi-persistent RS,
a RS not transmitted due to the network not gaining channel access,
a RS outside a discontinuous reception (DRX) active time, and
a RS transmission occasion is during a sleep time of the electronic device.

4. The WTRU of claim 1, wherein the WTRU indicates the selected new beam by sending a BFR request message to the base station.

5. A method performed by a wireless transmit/receive unit (WTRU), the method comprising:
receiving a beam failure recovery (BFR) configuration from a base station of a network, wherein the BFR configuration is associated with a first bandwidth part (BWP) of a monitored cell and comprises a configuration of at least one set of candidate beam reference signals (CB-RSs);
detecting a beam failure on the monitored cell;
determining at least one new set of CB-RSs from the at least one set of CB-RSs configured for the WTRU, wherein the at least one new set of CB-RSs configured for the WTRU is associated with a second BWP of the monitored cell;
switch from the first BWP of the monitored cell to a second BWP of the monitored cell using a BWP identity of the second BWP, wherein the BFR configuration that is associated with the first BWP indicates the BWP identity of the second BWP;
determining if one or more CB-RS in the at least one new set of CB-RSs of the second BWP meets a criterion, and in a case it is determined that the one or more CB-RS in the at least one new set of CB-RSs meets the criterion:
selecting one of the one or more CB-RS in the at least one new set of CB-RSs that meets the criterion as a new beam, and
indicating the selected new beam to the network via the second BWP.

6. The method of claim 5, wherein the criterion is an RS measurement result satisfying a threshold.

7. The method of claim 5, further comprising excluding from the at least one new set of CB-RSs at least one of:
a reference signal (RS) in a deactivated cell, a RS in an inactive BWP,
a deactivated semi-persistent RS,
a RS not transmitted due to the network not gaining channel access, a RS outside a discontinuous reception (DRX) active time, and
a RS transmission occasion is during a sleep time of the electronic device.

8. The method of claim 5, wherein the indicating the selected new beam to the network comprises sending a beam failure recovery, BFR, request message to the base station.

9. A method performed at a node of a network, the method comprising:
sending, to a wireless transmit/receive unit (WTRU), a beam failure recovery (BFR) configuration, wherein the BFR configuration is associated with a first band width part (BWP) of a cell of the network and comprises a configuration of at least one set of candidate beam reference signals (CB-RSs) for the WTRU, wherein at least one new set of CB-RSs for the WTRU is associated with a second BWP of the cell, and wherein the BFR configuration associated with the first BWP further comprises a BWP identity of a second BWP of the cell; and
receiving, from the WTRU, a message indicating that the WTRU detected a beam failure and comprising an indication of the second BWP selected by the WTRU, wherein the second BWP selected by the WTRU is associated with CB-RSs transmitted in the second BWP.

10. The method recited in claim 9, wherein the node of the network comprises a base station.

11. The method recited in claim 9, wherein the BFR configuration associated with the first BWP further comprises an indication of a measurement threshold to be used by the WTRU for selecting the one or more new beams.

12. The method recited in claim 9, wherein the second BWP is configured to be a fallback BWP for use by the WTRU upon detection of beam failure.

13. The method recited in claim 9, wherein the message received from the WTRU comprises a BFR request.

14. The method recited in claim 9, wherein the message further comprises an indication of the cell on which the WTRU detected beam failure.

15. A node of a network, wherein the node comprises a processor configured to:
send, to a wireless transmit/receive unit (WTRU) a beam failure recovery (BFR) configuration, wherein the BFR configuration is associated with a first band width part (BWP) of a cell of the network and comprises a configuration of at least one set of candidate beam reference signals (CB-RSs) for the WTRU, wherein at least one new set of CB-RSs for the WTRU is associated with a second BWP of the cell, and wherein the BFR configuration associated with the first BWP further comprises a BWP identity of a second BWP of the cell; and
receive, from the WTRU, a message indicating that the WTRU detected a beam failure and comprising an indication of the second BWP selected by the WTRU, wherein the second BWP selected by the WTRU is associated with CB-RSs transmitted in the second BWP.

16. The node recited in claim 15, wherein the node comprises a base station.

17. The node recited in claim 15, wherein the BFR configuration associated with the first BWP further comprises an indication of a measurement threshold to be used by the WTRU for selecting the one or more new beams.

18. The node recited in claim 15, wherein the second BWP is configured to be a fallback BWP for use by the WTRU upon detection of beam failure.

19. The node recited in claim 15, wherein the message received from the WTRU comprises a BFR request.

20. The node recited in claim 15, wherein the message further comprises an indication of the cell on which the WTRU detected beam failure.

* * * * *